United States Patent
Inoue et al.

(10) Patent No.: US 8,036,204 B2
(45) Date of Patent: *Oct. 11, 2011

(54) MOBILE TERMINAL, CONTROL APPARATUS, HOME AGENT AND PACKET COMMUNICATIONS METHOD

(75) Inventors: Masahiro Inoue, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/544,266

(22) Filed: Aug. 20, 2009

(65) Prior Publication Data

US 2009/0303936 A1  Dec. 10, 2009

Related U.S. Application Data

(63) Continuation of application No. 10/886,637, filed on Jul. 9, 2004.

(30) Foreign Application Priority Data

Jul. 9, 2003  (JP) ................................. 2003-194484

(51) Int. Cl.
  *H04J 3/24* (2006.01)
  *H04W 4/00* (2009.01)
  *H04L 12/56* (2006.01)
(52) U.S. Cl. .......................... 370/349; 370/328; 370/392
(58) Field of Classification Search .................. 370/349, 370/328, 392
  See application file for complete search history.

(56) References Cited

U.S. PATENT DOCUMENTS

| | | | |
|---|---|---|---|
| 5,903,568 A | 5/1999 | Tanaka et al. | |
| 6,101,188 A | 8/2000 | Sekine et al. | |
| 6,363,263 B1 | 3/2002 | Reudink et al. | |
| 6,457,056 B1 | 9/2002 | Choi | |
| 6,490,632 B1 * | 12/2002 | Vepa et al. ...................... | 709/250 |
| 7,000,012 B2 | 2/2006 | Moore et al. | |
| 7,043,256 B2 | 5/2006 | Ozugur et al. | |
| 7,065,367 B2 | 6/2006 | Michaelis et al. | |
| 7,145,866 B1 | 12/2006 | Ting et al. | |

(Continued)

FOREIGN PATENT DOCUMENTS

CN  1245374 A  2/2000

(Continued)

OTHER PUBLICATIONS

Ed. C. Perkins, et al., "IP Mobility Support for IPv4", Network Working Group, Request for Comments: 3344, IETF Standard Internet Engineering Task Force, XP-015009105, Aug. 2002, pp. 1-99.

(Continued)

*Primary Examiner* — Pierre-Louis Desir
*Assistant Examiner* — Timothy Pham
(74) *Attorney, Agent, or Firm* — Oblon, Spivak, McClelland, Maier & Neustadt, L.L.P.

(57) ABSTRACT

In a packet communications system, a control apparatus implements routing control of a received packet directed for the mobile terminal. The mobile terminal includes a plurality of network interface cards; a communication manager configured to select at least one network interface card among from the plurality of network interface cards, in accordance with information regarding the network interface card; and an upper layer manager configured to receive the packet transmitted from the control apparatus, with using a selected network interface card.

7 Claims, 16 Drawing Sheets

U.S. PATENT DOCUMENTS

| | | |
|---|---|---|
| 7,333,482 B2 * | 2/2008 | Johansson et al. ............ 370/353 |
| 7,352,753 B2 | 4/2008 | Glade et al. |
| 2002/0039357 A1 | 4/2002 | Lipasti et al. |
| 2003/0091012 A1 | 5/2003 | Barker, Jr. et al. |
| 2003/0108036 A1 | 6/2003 | Henry et al. |
| 2003/0198196 A1 | 10/2003 | Bahl et al. |
| 2004/0109472 A1 | 6/2004 | Choyi et al. |

FOREIGN PATENT DOCUMENTS

| | | |
|---|---|---|
| JP | 6-6362 | 1/1994 |
| JP | 8-181705 | 7/1996 |
| JP | 11-74927 | 3/1999 |
| JP | 11-355322 | 12/1999 |
| JP | 2000-32032 | 1/2000 |
| JP | 2000-183905 | 6/2000 |
| JP | 2001-127822 | 5/2001 |
| JP | 2001-339407 | 12/2001 |
| JP | 2002-290445 | 10/2002 |
| JP | 2003-143643 | 5/2003 |

OTHER PUBLICATIONS

N. A. Fikouras, et al., " Filters for Mobile IP Bindings (NOMAD) draft-nomad-mobileip-filters-02. txt", Mobile IP working Group internet-Draft, XP-002236721, Jul. 2002, 13 pages.

Kazuhiro Shitama, et al., "Design and Implementation of Mobility Oriented Network Architecture", Information Processing Society of Japan Journal, vol. 41, No. 7, Jul. 15, 2000, pp. 2040-2048 and 2 cover pages. (with English Abstract).

* cited by examiner

| IP ADDRESS | MAC ADDRESS | PAGING AREA |
|---|---|---|
| IP_MN#1 | MAC ADDRESSES #1, #2, ···, #n | SUBNETS #1, #2 |
| | | |

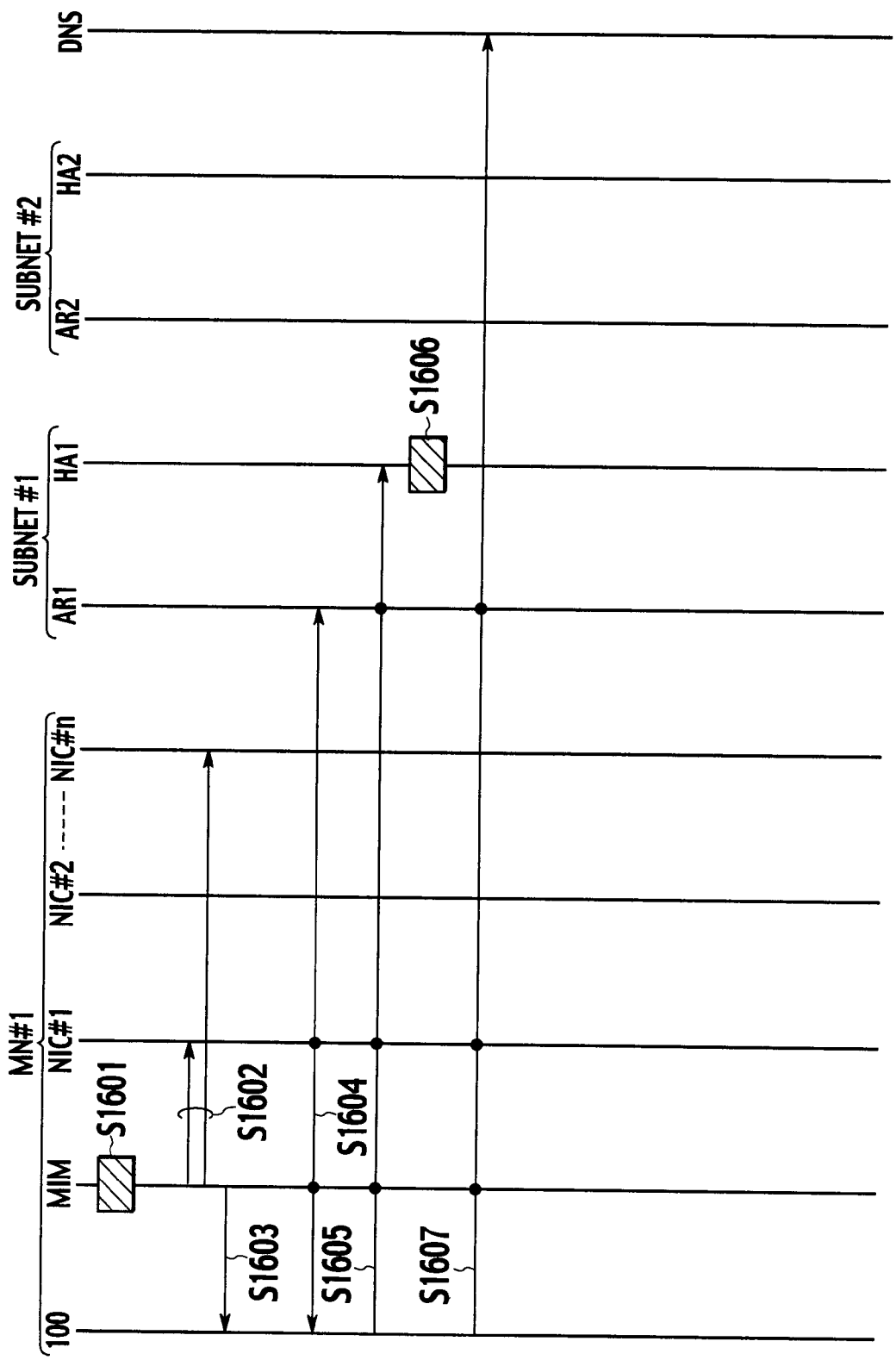

MOBILE TERMINAL, CONTROL APPARATUS, HOME AGENT AND PACKET COMMUNICATIONS METHOD

CROSS-REFERENCE TO RELATED APPLICATIONS

This application is a continuation of and is based upon and claims the benefit of priority under 35 U.S.C. §120 for U.S. Ser. No. 10/886,637, filed Jul. 9, 2004, and claims the benefit of priority under 35 U.S.C. §119 from Japanese Patent Application No. 2003-194484, filed Jul. 9, 2003, the entire contents of each of which are incorporated herein by reference.

BACKGROUND OF THE INVENTION

1. Field of the Invention

The present invention relates to a mobile terminal and a control apparatus which are used in a packet communications system in which the control apparatus implements routing control of a received packet destined for the mobile terminal.

The present invention also relates to a mobile terminal and a control apparatus which are used in a packet communications system implementing paging control. In the paging control, the control apparatus transmits a paging notification packet to a paging area of the mobile terminal when receiving a packet destined for the mobile terminal, so as to acquire location information of the mobile terminal and to decide a transfer destination of the packet.

The present invention further relates to a mobile terminal and a home agent which are used in a packet communications system in which a plurality of home agents implement routing control of a received packet destined for the mobile terminal, in accordance with each home address and each care-of address.

2. Description of the Related Art

A conventional packet communications system has been configured to confirm reachability of an IP packet, by using the address resolution protocol (ARP) or the neighbor discovery protocol (NDP), prior to the transfer of the IP packet using a unicast address.

The ARP and NDP are defined to associate a link layer address (or a card address) of a network interface card and a network layer address (an IP address) with each other.

Note that an IP address is decided by means of static setting where the IP address is assigned to a network interface card in advance, or by means of dynamic setting such as the dynamic host configuration protocol (DHCP). Alternatively, an IP address is decided by calculation using an address automatic generation technology used in IPv6, based on a network interface card address on a link layer and random numbers.

In the conventional packet communications system, when a mobile terminal (a mobile node or a host) has a plurality of network interface cards as means for allowing a packet to reach its destination, a customer-oriented interface application technology is implemented as an interactive application technology such as an access link manager.

In this customer-oriented interface application technology, for example, a network interface card corresponding to a communication link system having low communication costs is selected among from the plurality of network interface cards.

In such a case, a multiple interface manager (MIM), which manages a plurality of network interface cards, is known as a method of selecting a network interface card autonomously.

The MIM is configured to make a predetermined conditional decision using attributes and measured values collected from each of the network interface cards, so as to select a network interface card to be used.

Conventionally, a packet communications system which implements a mobility management control technology including a Mobile IP technology and an expansion technology of the Mobile IP technology has been known as a communications system which enables transfer of a packet destined for a mobile terminal.

In the mobility management control technology, a home address is used as a controlling unit of packet transfer.

Here, the home address is assigned to each mobile terminal on a home link where a home agent exists, and, for example, the home address is an IP address which belongs to a subnet of the home link.

The packet communications system, which implements the abovementioned mobility management control technology, is configured to perform routing control independently by using each home address as a unit, when a mobile terminal (a mobile node) has a plurality of home addresses as means for allowing a packet to reach its destination, for example, when the mobile terminal is connected to a plurality of home agents depending on application of the mobile terminal and a kind of communications system being used, or when the mobile terminal is in a multi-home situation where the mobile terminal has a plurality of home addresses within the same home agent.

However, in the technique of selecting a network interface card in the conventional packet communications system, an IP address (network layer address) is not particularly considered, and correspondence between the network interface card and the IP address is thus not maintained.

Therefore, the conventional technique of selecting a network interface card has a problem in that address resolution means, such as the ARP and the NDP, is required in order to acquire the abovementioned correspondence, every time a network interface card to be used changes, even among network interface cards to which the same IP address has been assigned.

The conventional technique of selecting a network interface card also has a problem in that an IP address to be used changes when a network interface card to be used changes, so that a procedure for changing a packet's route is required.

For example, in the IPv6 automatic address generation technology using a link layer address, an IP address to be used changes every time a network interface card to be used changes, even where the mobile terminal belongs to the same network domain, so that a procedure for changing a packet's route is required.

Further, even in a case of automatic allocation (dynamic setting) of an IP address by the network side, like the DHCP, a procedure for changing a packet's route is required. This is because network domains generally differ from each other when the kind or owner of the relevant communication link (access link) system is different. Therefore, a IP address to be used changes every time a network interface card to be used changes.

In other words, in the conventional packet communications system, a mobile terminal is required to register an IP address with a control apparatus (such as a routing control agent and a relay agent) within the IP network and with a transmitting terminal, every time a network interface card to be used changes. A packet is reached to the mobile terminal by using the IP address.

Therefore, the conventional packet communications system has a problem in that IP packets related to the aforesaid registration pass through wireless links, so that wireless resources are wasted.

It is highly likely that this problem causes another problem in a paging control technology.

The paging control technology reduces an amount of control signals related to location registration control of the mobile terminal, by registering the location of the mobile terminal per paging area wider than a location registration area, and also reduces power requirements together with an intermittent reception technology of the mobile terminal.

The problem in the paging control technology is that a paging agent cannot acquire location information (subnet) of the mobile terminal accurately.

Meanwhile, the conventional mobility management technology does not maintain the correspondence among a plurality of IP addresses assigned to the same mobile terminal.

Therefore, when an IP packet destined for the mobile terminal is transmitted and the IP packet cannot reach the mobile terminal through a transfer route generated based on a specific home address due to link disconnection or the like, the transfer of the IP packet fails even where a transfer route generated based on a different home address is available and the IP packet could reach the mobile terminal through the transfer route.

Further, the conventional packet communications system does not maintain the correspondence among a plurality of IP addresses, even when the mobile terminal dynamically changes validity and invalidity of the plurality of IP addresses in accordance with applications, communication costs, and power-saving control of network interface cards.

Therefore, the conventional packet communications system has a problem in that a transfer of a packet from a transmitting terminal to a mobile terminal fails.

In such a case, the mobile terminal notifies the transmitting terminal or a name resolution (DNS: domain name system) server of the change between validity and invalidity of the IP addresses by using a control packet, every time the mobile terminal changes validity and invalidity of the IP addresses.

Therefore, the conventional packet communications system has a problem in that resources are wasted according to the frequency of such notification.

SUMMARY OF THE INVENTION

In viewing of the foregoing, it is an object of the present invention to provide a mobile terminal, a control apparatus, and a home agent, which are used in a packet communications system capable of ensuring reachability of a packet without wasting wireless resources, even when a network interface card to be used changes.

A first aspect of the present invention is summarized as a mobile terminal in a packet communications system in which a control apparatus implements routing control of a received packet directed for the mobile terminal. The mobile terminal includes a plurality of network interface cards; a communication manager configured to select at least one network interface card among from the plurality of network interface cards, in accordance with information regarding the network interface card; and an upper layer manager configured to receive the packet transmitted from the control apparatus, with using a selected network interface card.

In the first aspect, the packet communications system can be configured to implement paging control in which the control apparatus transmits a paging notification packet to a paging area of the mobile terminal when receiving of the packet directed for the mobile terminal, so as to acquire location information of the mobile terminal and to decide a transfer destination of the packet. The communication manager can include a collector configured to collect link layer addresses set for the network interface cards; and a decider configured to decide a representative link layer address among from collected link layer addresses. The upper layer manager can include a notifier configured to notify the control apparatus of the representative link layer address by using the selected network interface card, when transmitting a paging registration packet for forming the paging area; and an address resolver configured to perform address resolution by using the representative link layer address and a predetermined network layer address.

In the first aspect, the communication manager can further include a representative link layer address setter configured to set the representative link layer address to all the network interface cards.

In the first aspect, the communication manager can further include a filtering controller configured to instruct all the network interface cards to stop an address filtering function on a link layer.

In the first aspect, the communication manager can further include a collector configured to collect link layer addresses set for the network interface cards. The upper layer manager can further include a notifier configured to notify the control apparatus of a predetermined network layer address and collected link layer addresses, by using the selected network interface card.

In the first aspect, the packet communications system can be configured to implement paging control in which the control apparatus transmits a paging notification packet to a paging area of the mobile terminal when receiving of the packet directed for the mobile terminal, so as to acquire location information of the mobile terminal and to decide a transfer destination of the packet. The notifier can be configured to notify the control apparatus of the plurality of link layer addresses together with a paging registration packet for forming the paging area.

In the first aspect, each of a plurality of home agents can be configured to implement routing control of a received packet destined for the mobile terminal, in accordance with each home address and each care-of address, in the packet communications system. Each of the plurality of network interface cards can be configured to be connectable to the plurality of home agents. The upper layer manager can include a manager configured to manage to associate each of the network interface cards with each of the home addresses; and an instructor configured to instruct the plurality of home agents to transfer the packet destined for the mobile terminal to a home address associated with the selected network interface card.

In the first aspect, the instructor can be configured to gives the instruction to the plurality of home agents, by binding update for the representative home address.

In the first aspect, the packet communications system can be configured to transfer the packet destined for the mobile terminal to the home agents through a DNS server. The instructor can be configured to instruct the DNS server to transfer the packet destined for the mobile terminal to the representative home address.

A second aspect of the present invention is summarized as a control apparatus in a packet communications system implementing paging control in which the control apparatus transmits a paging notification packet to a paging area of a mobile terminal, when receiving a packet destined for the mobile terminal, so as to acquire location information of the mobile terminal and to decide a transfer destination of the packet. The control apparatus includes a receiver configured to receive a representative link layer address together with a paging registration packet from the mobile terminal including a plurality of network interface cards; a manager configured to manage the paging area of the mobile terminal, in accordance with a network layer address assigned to the mobile terminal and the received representative link layer address. The paging area of the mobile terminal is formed in accordance with the paging registration packet. The representative link layer address is decided among from link layer addresses set for the network interface cards.

A third aspect of the present invention is summarized as a control apparatus in a packet communications system in which the control apparatus implements routing control of a received packet destined for a mobile terminal. The control apparatus includes a receiver configured to receive a plurality of link layer addresses from the mobile terminal including a plurality of network interface cards; and a manager configured to manage routing control information for implementing the routing control in accordance with a network layer address assigned to the mobile terminal and the plurality of representative link layer addresses. Each of the plurality of link layer addresses being set for each of the network interface cards In the third aspect, the packet communications system can be configured to implement paging control in which the control apparatus transmits a paging notification packet to a paging area of a mobile terminal when receiving the packet destined for the mobile terminal, so as to acquire location information of the mobile terminal and to decide a transfer destination of the packet. The receiver can be configured to receive the plurality of link layer addresses together with a paging registration packet from the mobile terminal including the plurality of network interface cards. The paging area of the mobile terminal is formed in accordance with the paging registration packet. Each of the plurality of link layer addresses is set for each of the network interface cards. The manager can be configured to manage the paging area of the mobile terminal in accordance with the network layer address and the plurality of received representative link layer addresses.

A fourth aspect of the present invention is summarized as a home agent in a packet communications system in which a plurality of home agents implement routing control of a received packet destined for a mobile terminal, in accordance with each home address and each care-of address. The home agent includes a receiver configured to receive a representative home address from the mobile terminal including a plurality of network interface cards; and a packet transferor configured to transfer the packet destined for the mobile terminal to the representative home address. The representative home address is decided among from the home addresses associated with the network interface cards.

In the fourth aspect, the home agent can further include a routing information manager configured to manage routing information destined for the representative home address. The packet transferor can be configured to transfer the packet destined for the mobile terminal, in accordance with the routing information destined for the representative home address. The routing information manager can be configured to update the routing information destined for the representative home address in accordance with binding update from the mobile terminal.

In the fourth aspect, the packet communications system can include a control apparatus which transmits a paging notification packet to a paging area of the mobile terminal when receiving the packet destined for the mobile terminal, so as to acquire location information of the mobile terminal and to decide a transfer destination of the packet. The routing information destined for the representative home address is set so that the packet destined for the mobile terminal is transferred to the control apparatus.

A fifth aspect of the present invention is summarized as a packet communications method in which a control apparatus implements routing control of a received packet directed for a mobile terminal. The method includes selecting at least one network interface card among from a plurality of network interface cards included in the mobile terminal, in accordance with information regarding the network interface card; and receiving the packet transmitted from the control apparatus, with using a selected network interface card.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 17 is a sequence diagram showing an operation of the packet communications system according to the fifth embodiment of the present invention.

DETAILED DESCRIPTION OF THE PREFERRED EMBODIMENTS

Figure 1:
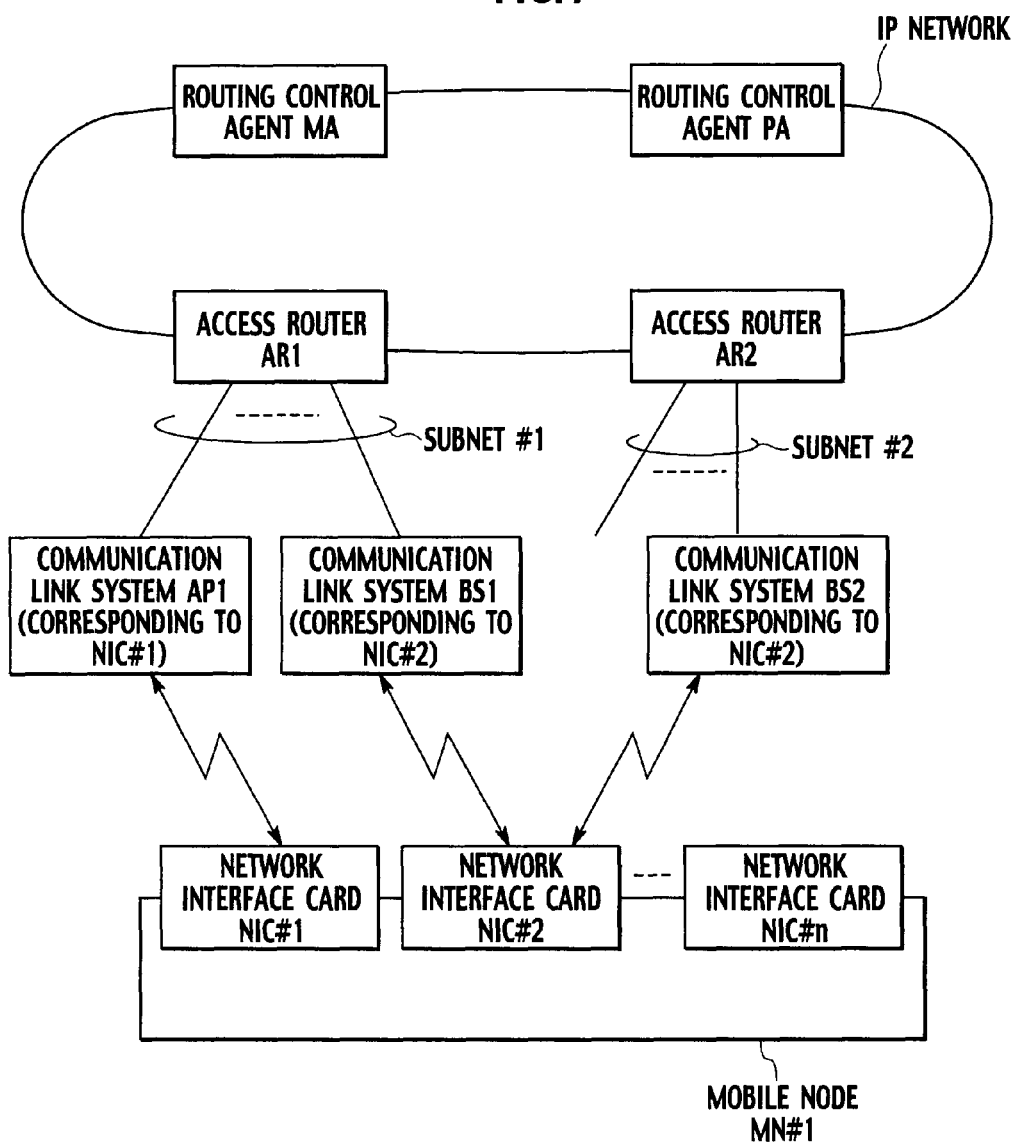
FIG. 1 is a block diagram of the entire packet communications system according to first to third embodiments of the present invention.

Referring now to the drawings, wherein like reference numerals designate identical or corresponding parts throughout the several views.

Configuration of Packet Communications System According to the First Embodiment of the Present Invention The configuration of a packet communications system according to a first embodiment of the present invention is described with reference to FIGS. 1 to 3.

As shown in FIG. 1, the packet communications system according to this embodiment includes routing control agents MA and PA, access routers AR1 and AR2, communication link systems AP1, BS1 and BS2, and a mobile node MN#1.

The packet communications system according to this embodiment is configured to implement paging control in which the routing control agent (control apparatus) PA transmits a paging notification packet to a paging area of the mobile node MN#1, when receiving a packet destined for the mobile node (mobile terminal) MN#1, so as to acquire location information (subnet) of the mobile node MN#1 and to decide a transfer destination of the packet.

Figure 2:
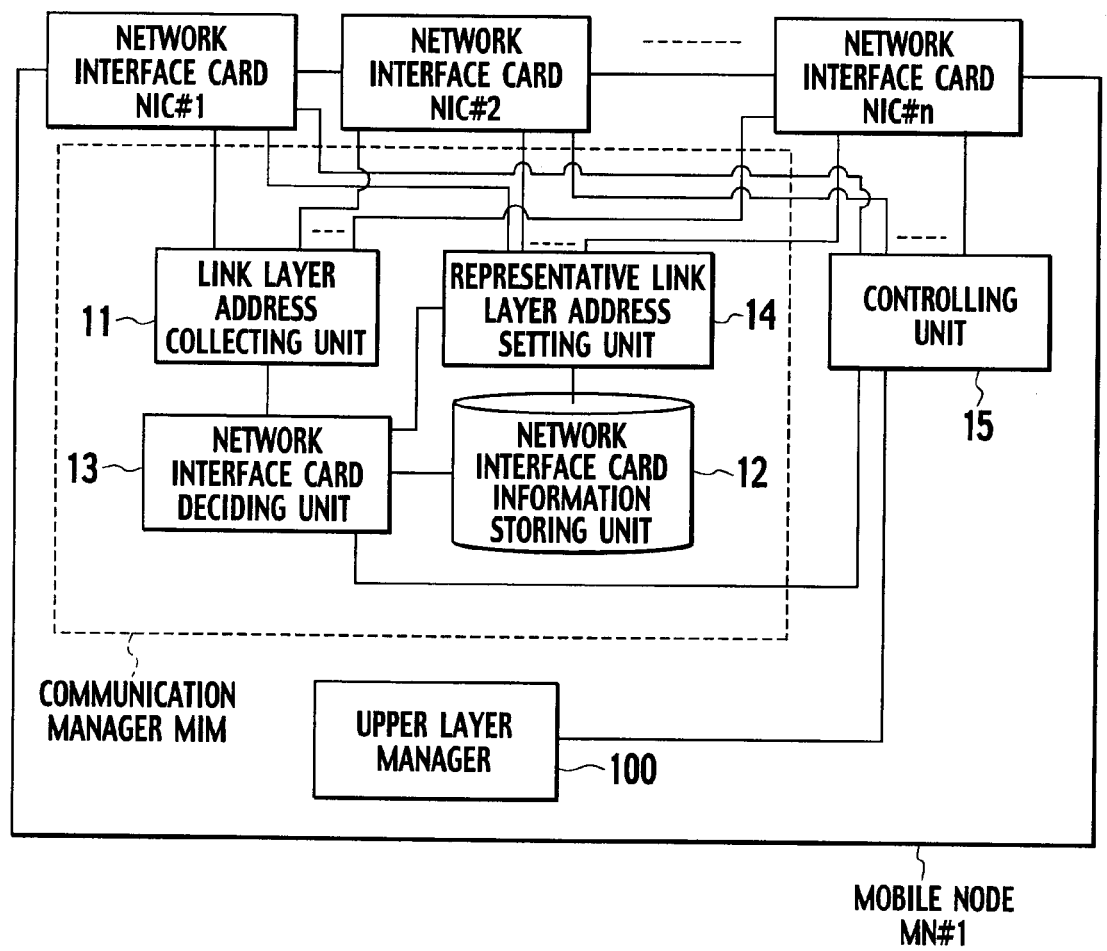
FIG. 2 is a functional block diagram of a mobile node according to the first embodiment of the present invention.

As shown in FIG. 2, the mobile node MN#1 includes a plurality of network interface cards NIC#1 to NIC#n, a communication manager MIM, a controlling unit 15, and an upper layer manager 100.

A MAC address (a link layer address) is set for each of the plurality of network interface cards NIC#1 to NIC#n.

The network interface card NIC#1 can be connected to the communication link system AP1, and the network interface card NIC#2 can be connected to the communication link systems BS1 and BS2.

The mobile node MN#1 can be connected to an IP network by using the network interface cards NIC#1 to NIC#n through the communication link systems and access routers AR.

The communication manager MIM includes a link layer address collecting unit 11, a network interface card information storing unit 12, a network interface card deciding unit 13, and a representative link layer address setting unit 14.

The link layer address collecting unit 11 configures a collecting unit which collects the MAC addresses set for the network interface cards NIC#1 to NIC#n, respectively.

The link layer address collecting unit 11 may also be configured to collect characteristics of the network interface cards NIC#1 to NIC#n, together with the abovementioned MAC addresses, from the individual network interface cards NIC#1 to NIC#n.

The network interface card information storing unit 12 is configured to store information regarding the network interface cards, such as the MAC addresses and the characteristics, which are collected from the individual network interface cards NIC#1 to NIC#n.

Here, the characteristics mentioned above include the kinds of link systems to which the network interface cards can be connected, communication costs, power measurements (consumption power, SIR, etc.), precedence reflecting user preferences (utilization for business use or the like), and so forth.

The network interface card deciding unit 13 is configured to select at least one network interface card among from a plurality of network interface cards NIC#1 to NIC#n, in accordance with the information regarding to the network interface card (the characteristics).

The network interface card deciding unit 13 is configured to decide a representative MAC address among from the MAC addresses collected by the link layer address collecting unit 11.

The network interface card deciding unit 13 may be configured to select the network interface card which conform to a predetermined condition, in accordance with an instruction by a user, so as to select the MAC address set for the selected network interface card as the representative MAC address.

The network interface card deciding unit 13 may be configured to select the network interface card and the representative MAC address, in accordance with information (for example, a predetermined flag) which is added to a packet to be transmitted.

Note that the network interface card deciding unit 13 may also be configured to decide a MAC address randomly selected among from the collected MAC addresses, as a representative MAC address.

The representative link layer address setting unit 14 is configured to set the representative MAC address to all the network interface cards NIC#1 to NIC#n.

The controlling unit 15 is configured to control all the functions of the mobile node MN#1 which includes the communication manager MIM and the upper layer manager 100.

Moreover, the controlling unit 15 is configured to cause the mobile node MN#1 to operate in accordance with an operation mode (a normal mode or a paging control mode).

While operating in the normal mode, the mobile node MN#1 is controlled by the controlling unit 15 so that the mobile node MN#1 performs mobility management operations based on the mobile IP technology or the expanded technology of the Mobile IP technology.

On the other hand, while operating in the paging control mode, the mobile node MN#1 is controlled by the controlling unit 15 to suspend the mobility management operations and to transmit a paging registration packet for forming a paging area to the routing control agent PA.

The upper layer manager 100 is configured to perform control operations on layers upper than the link layer (for example, on a network layer).

For example, the upper layer manager 100 collaborates with the routing control agent MA as required, so as to perform control operations on an IP layer, realizing transmission and reception of an IP packet.

To be more specific, the upper layer manager 100 is configured to receive the IP packet transmitted from the routing control agent (the control apparatus) PA, by using the network interface card selected by the network interface card deicing unit 13 of the communication manager MIM.

Also, the upper layer manger 100 is configured to notify the routing control agent (control apparatus) PA of the representative MAC address, when transmitting the paging registration packet for forming a paging area of the mobile node MN#1 to the routing control agent PA. Here, the paging registration packet may contain an IP address and the representative MAC address.

Further, the upper layer manager 100 is configured to perform address resolution by the use of the representative MAC address and a predetermined IP address (a predetermined network layer address).

To be more specific, the upper layer manager 100 is configured to perform an address resolution procedure in which a correspondence between the representative MAC address and the predetermined IP address (the predetermined network layer address) is registered in the upper layer manager 100, the communication manager MIM, the network interface card to be used, communication link system AP1 and the access router AR1.

As a result, the MAC address to be used does not change even when the network interface card NIC to be used changes. Therefore, the mobile node MN#1 can continue its communication without any address resolution process such as the ARP, the NDP, and the like.

Further, similarly to the above, when the mobile node MN#1 exists in a router segment where an IP address is assigned to the mobile node MN#1 by automatic generation of the IP address based on the MAC address set for the network interface card NIC, the MAC address to be used does not change, so that the IP address does not change either.

Therefore, there is no route change when the network interface card NIC to be used changes on communication links within the same router segment.

Note that the mobile node MN#1 is not required to transmit the paging registration packet because the MAC address to be used and the IP address to be used do not change, even when the network interface card to be used NIC changes.

Therefore, the number of transmitted paging registration packets can be suppressed.

Figure 3:
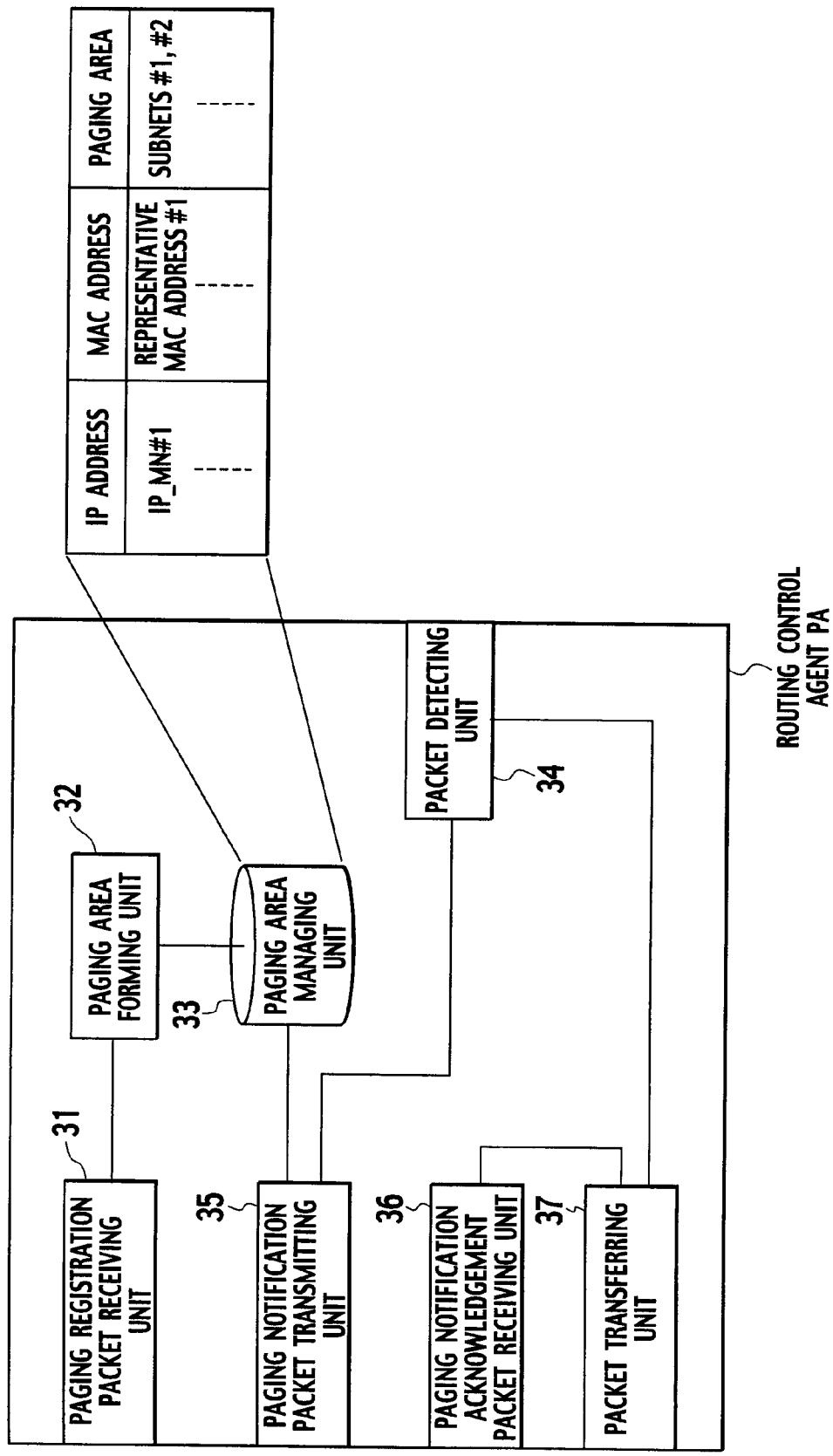
FIG. 3 is a functional block diagram of a routing control agent according to the first embodiment of the present invention.

As shown in FIG. 3, the routing control agent PA is a control apparatus including a paging registration packet receiving unit 31, a paging area forming unit 32, a paging area managing unit 33, a packet detecting unit 34, a paging notification packet transmitting unit 35, a paging notification acknowledgement packet receiving unit 36, and a packet transferring unit 37.

The paging registration packet receiving unit 31 is configured to receive the paging registration packet for forming a paging area of the mobile node MN#1, which has been transmitted from the mobile node MN#1, and then to transmit the paging registration packet to the paging area forming unit 32.

Also, the paging registration packet receiving unit 31 is configured to receive the representative MAC address together with the abovementioned paging registration packet, from the mobile node MN#1 which includes the plurality of network interface cards NIC#1 to NIC#n.

The representative MAC address has been decided among from the MAC addresses set for the network interface cards NIC#1 to NIC#n, respectively.

Further, the paging registration packet receiving unit 31 transmits a paging registration response packet to the mobile node MN#1, through the access router AR1, the communication link system AP1, the network interface card NIC#1 and the communication manager MIM.

The paging registration response packet notifies the mobile node MN#1 that the paging area has been formed.

The paging area forming unit 32 is configured to form the paging area of the mobile node MN#1 in accordance with the received paging registration packet.

For example, the paging area forming unit 32 forms subnets #1 and #2 as the paging area of the mobile node MN#1 in accordance with information indicating the subnets which is contained in the received paging registration packet.

The paging area managing unit 33 is configured to manage the paging area of the mobile node MN#1.

For example the paging area managing unit 33 stores an "IP address", a "MAC address" and a "paging area" while associating them with each other.

In the example shown in FIG. 3, the paging area managing unit 33 manages "IP_MN#1" as the IP address, "representative MAC address #1" as the MAC address, and "subnets #1 and #2" as the paging area.

In other words, the paging area managing unit 33 configures a managing unit which manages the paging area of the mobile node MN#1 based on the IP address "IP_MN#1" assigned to the mobile node MN#1 and the received representative MAC address "representative MAC address #1".

The packet detecting unit 34 is configured to detect and buffer an IP packet destined for the mobile node MN#1, and to notify this fact to the paging notification packet transmitting unit 35.

The packet detecting unit 34 is further configured to transmit the buffered IP packet destined for the mobile node MN#1, in accordance with an instruction from the packet transferring unit 37.

The paging notification packet transmitting unit 35 is configured to transmit the paging notification packet to the subnets #1 and #2 which form the paging area of the mobile node MN#1, in accordance with the notification from the packet detecting unit 34.

The paging notification acknowledgement packet receiving unit 36 is configured to receive a paging notification acknowledgement packet transmitted from the mobile node MN#1, and to notify the packet transferring unit 37 of the receipt of the packet.

The packet transferring unit 37 is configured to extract an IP packet corresponding to the received paging notification acknowledgement packet, from the packet detecting unit 34.

The packet transferring unit 37 is configured to transfer the extracted IP packet, in accordance with the subnets of the mobile node MN#1, which are contained in the paging notification acknowledgement packet.

The access routers AR1 and AR2 are located within the IP network, and each of the access routers AR1 and AR2 is configured to perform a routing process based on the IP address.

For example, the access router AR1 is connected to the communication link systems AP1 and BS1, and manages the subnet #1. The access router AR2 is connected to the communication link system BS2, and manages the subnet #2.

The communication link systems are connected to the access routers ARs, and each of the communication link systems is configured to perform transfer control on the link layer based on the MAC addresses.

Operation of Packet Communications System According to the First Embodiment

The operation of the packet communications system according to this embodiment is described with reference to FIGS. 4 and 5.

Figure 4:
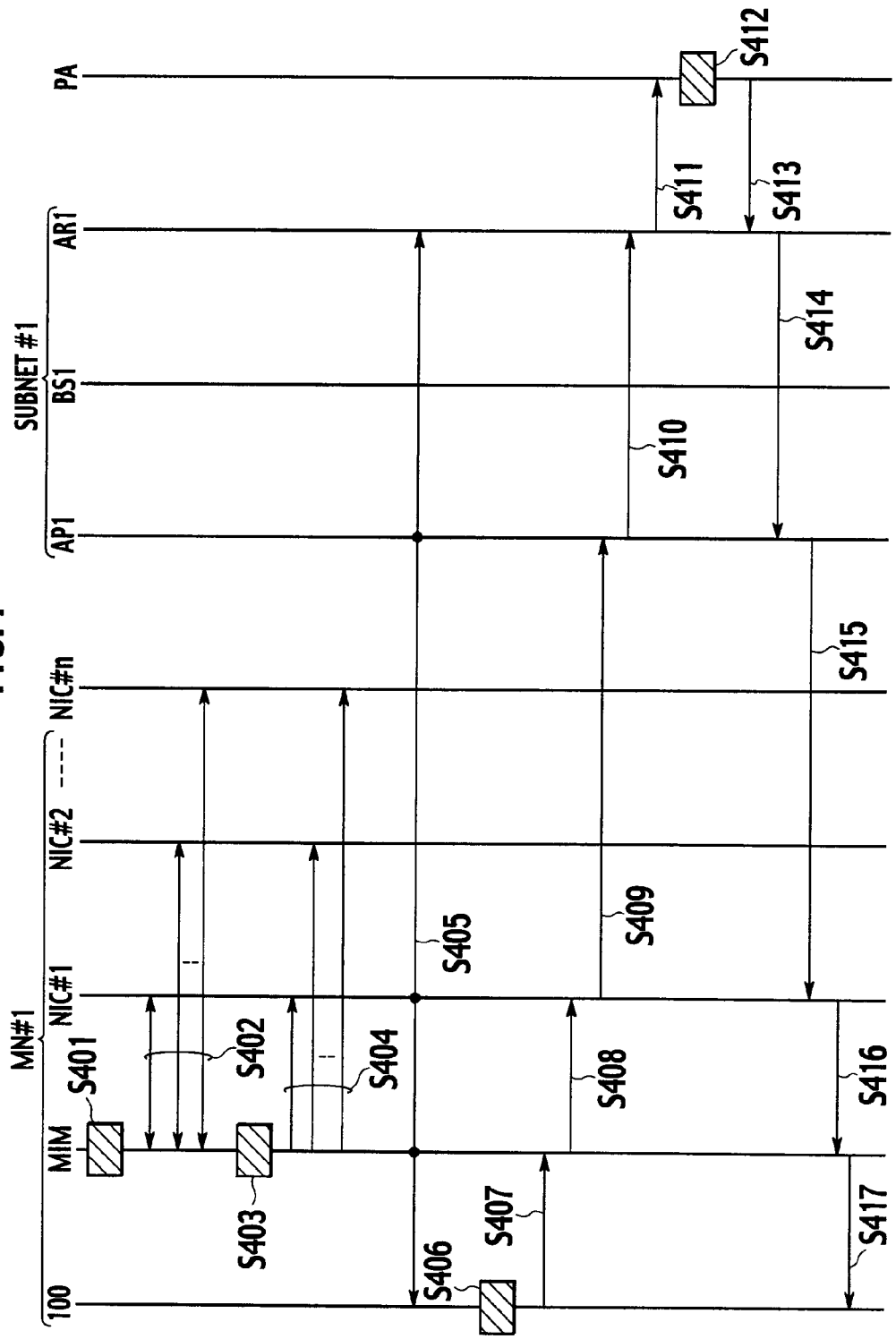
FIG. 4 is a sequence diagram showing an operation of the packet communications system according to the first embodiment of the present invention.

As shown in FIG. 4, in Step 401, the mobile node MN#1 is powered up, or the network interface card NIC is added to the mobile node MN#1.

In Step 402, the link layer address collecting unit 11 collects the MAC addresses set for the network interface cards NIC#1 to NIC#n, respectively.

In Step 403, the network interface card deciding unit 13 decides a representative MAC address among from the collected MAC addresses, and also decides the network interface card NIC#1 to be used.

In Step 404, the representative link layer address setting unit 14 sets the representative MAC address for all the network interface cards NIC#1 to NIC#n.

In Step 405, the upper layer manager 100 performs an address resolution process between the upper layer manager 100 and the access router AR1, through the communication manager MIM, the network interface card NIC#1, and the communication link system AP1, by using the aforementioned representative MAC address and a predetermined IP address.

In other words, in Step 405, the correspondence between the representative MAC address and the predetermined IP address is registered in the upper layer manager 100, the communication manager MIM, the network interface card NIC#1, the communication link system AP1, and the access router AR1.

In Step 406, the controlling unit 15 starts an operation in the paging control mode.

In Steps 407 to 411, the upper layer manager 100 transmits a paging registration packet which contains the aforesaid representative MAC address and the predetermined IP address, to the routing control agent PA, through the communication manager MIM, the network interface card NIC#1, the communication link system AP1, and the access router AR1, by the use of the aforesaid representative MAC address and the IP address, without carrying out a new address resolution process.

In other words, in Steps 407 to 411, the upper layer manager 100, the communication manager MIM, the network interface card NIC#1, the communication link system AP1, and the access router AR1 transfer the paging registration packet, in accordance with the registered correspondence, respectively.

In Step 412, the paging area forming unit 32 forms a paging area (for example, the subnets #1 and #2) associated with the abovementioned representative MAC address and the predetermined IP address, in accordance with the received paging registration packet.

In Steps 413 to 417, the paging registration packet receiving unit 31 transmits a paging registration response packet to the upper layer manager 100 of the mobile node MN#1, through the access router AR1, the communication link system AP1, the network interface card NIC#1, and the communication manager MIM, by using the abovementioned representative MAC address and the IP address, without carrying out a new address resolution process.

The paging registration response packet is a packet for notifying the upper layer manager 100 that the paging area has been formed.

In other words, in Steps 414 to 417, the access router AR1, the communication link system AP1, the network interface card NIC#1, the communication manager MIM, transfer the paging registration response packet, in accordance with registered the correspondence, respectively.

Figure 5:
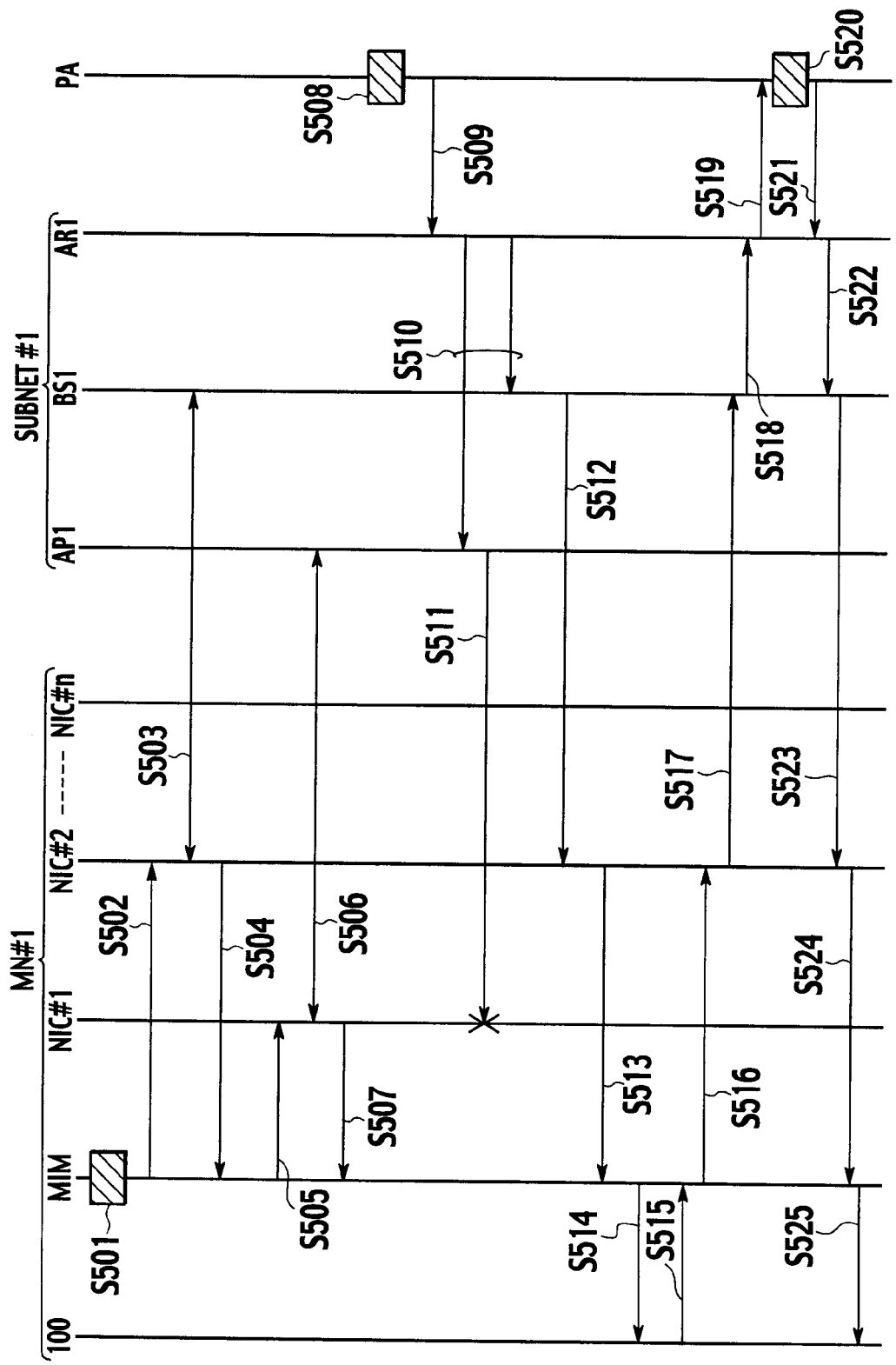
FIG. 5 is a sequence diagram showing the operation of the packet communications system according to the first embodiment of the present invention.

As shown in FIG. 5, in Step 501, the network interface card deciding unit 13 decides to change the network interface card to be used from the network interface card NIC#1 to the network interface card NIC#2.

In Step 502, the controlling unit 15 instructs the network interface card NIC#2 to start its operation.

In Step 503, the network interface card NIC#2 establishes a communication link between the network interface card NIC#2 and the communication link system BS1, by using the set representative MAC address.

In Step 504, the network interface card NIC#2 notifies the controlling unit 15 that the network interface card NIC#2 has started its operation.

In Step 505, the controlling unit 15 instructs the network interface card NIC#1 to suspend its operation.

In Step 506, the network interface card NIC#1 releases the communication link between the network interface card NIC#1 and the communication link system AP1, by using the set representative MAC address.

In Step 507, the network interface card NIC#1 notifies the controlling unit 15 that the network interface card NIC#1 has suspended its operation.

In Step 508, the packet detecting unit 34 of the routing control agent PA receives a packet destined for the mobile node MN#1.

In Step 509, the paging notification packet transmitting unit 35 transmits a paging notification packet to the access router AR1.

The paging notification packet is a packet for notify the access router AR1 that the packet destined for the mobile node MN#1 has been received.

In Step 510, the access router AR1 transmits the abovementioned paging notification packet to the communication link systems AP1 and BS1 which manage the paging area of the mobile node MN#1, that is, the subnets #1 and #2.

In Steps 511 and 512, the communication link systems AP1 and BS1 transmit the abovementioned paging notification packet to the network interface cards NIC#1 and NIC#2, respectively, by using the foregoing representative MAC address and the IP address, without carrying out a new address resolution process. Here, the paging notification packet mentioned above is not received by the network interface card NIC#1.

In other words, in Steps 511 and 512, the communication link systems AP1 and BS1 transmit the paging notification packet to the network interface cards NIC#1 and NIC#2, in accordance with the registered correspondence, respectively.

In Steps 513 and 514, the paging notification packet received by the network interface card NIC#2 is transmitted to the upper layer manager 100.

In Steps 515 to 519, the upper layer manager 100 transmits a paging notification acknowledgement packet corresponding to the abovementioned paging notification packet, to the routing control agent PA, through the communication manager MIM, the network interface card NIC#2, the communication link system BS1, and the access router AR1, by using the foregoing representative MAC address and the IP address, without carrying out a new address resolution process.

In other words, in Steps 515 to 519, the upper layer manager 100, the communication manager MIM, the network interface card NIC#2, the communication link system BS1, and the access router AR1 transfer the paging notification acknowledgement packet, in accordance with the registered correspondence, respectively.

In Step 520, the packet transferring unit 37 extracts the packet destined for the mobile node MN#1, which has been buffered in the packet detecting unit 34, in accordance with the received paging notification acknowledgement packet.

In Steps 521 to 525, the packet transferring unit 37 transmits the packet destined for the mobile node MN#1 to the upper layer manager 100, through the access router AR1, the communication link system BS1, the network interface card NIC#2 and the communication manager MIM, by using the foregoing representative MAC address and the IP address, without carrying out a new address resolution process.

In other words, in Steps 522 to 525, the access router AR1, the communication link system BS1, the network interface card NIC#2, the communication manager MIM, transfer the packet destined for the mobile node MN#1, in accordance with the registered correspondence, respectively.

Operational Effect of Packet Communications System According to the First Embodiment of the Invention According to the packet communications system of this embodiment, the address resolution is conducted by using the representative MAC address (the representative link layer address) and the predetermined IP address (the network layer address) even when the mobile node MN#1 includes the plurality of network interface cards NIC#1 to NIC#n. Therefore, generation of an IP packet (for example, a paging registration packet) accompanied by the change of the network interface card NIC to be used can be prevented.

Moreover, according to the packet communications system of this embodiment, the representative MAC address is decided based on applications, communication quality, communication costs, power-saving control and the like. Therefore, all packets can be received through optimal transfer routes which satisfy various conditions.

Packet Communications System According to the Second Embodiment of the Present Invention A packet communications system according to a second embodiment of the present invention is described with reference to FIGS. 6 to 8.

Description below is mainly about differences of the packet communications system according to this embodiment from the packet communications system according to the foregoing first embodiment.

Figure 6:
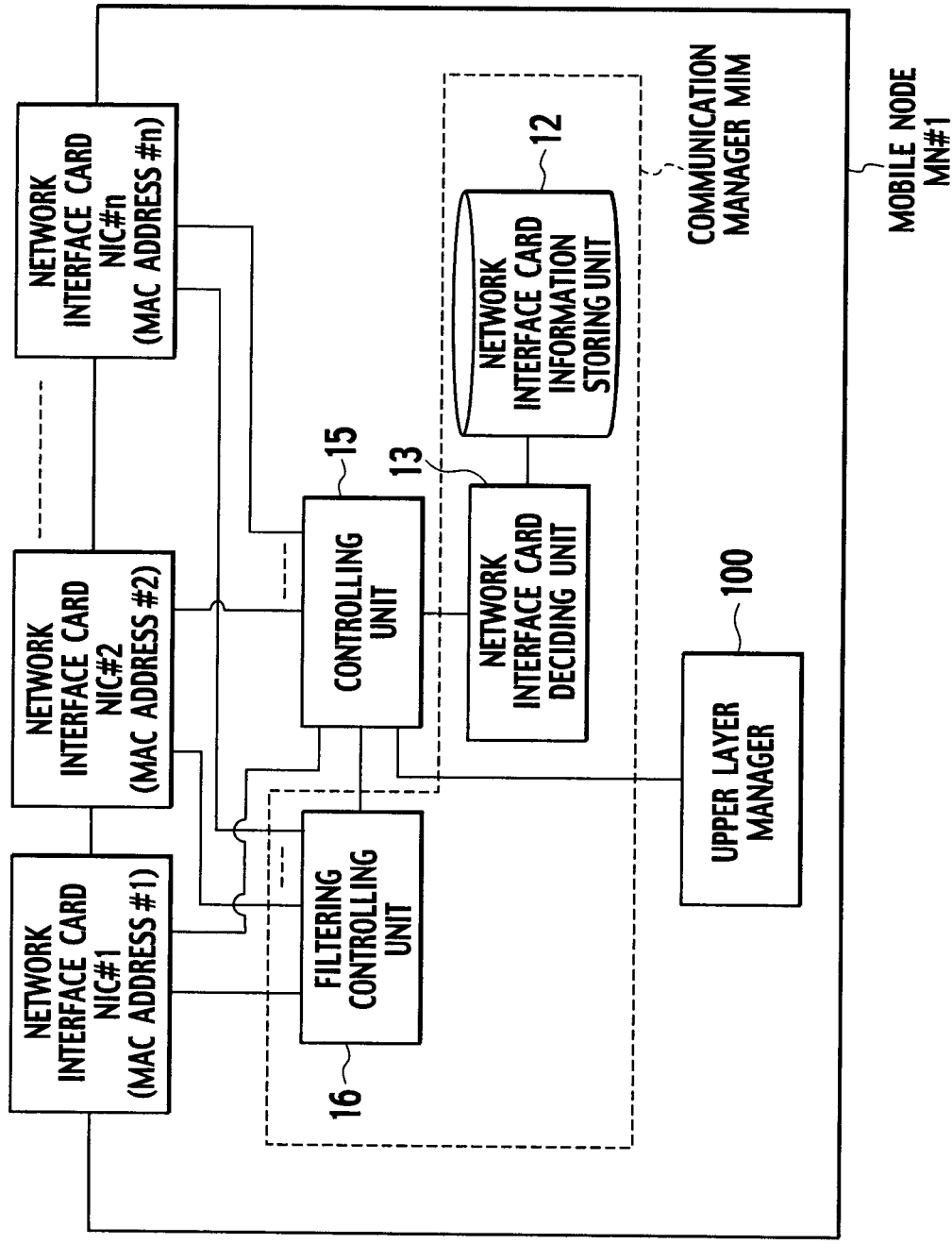
FIG. 6 is a functional block diagram of a mobile node according to the second embodiment of the present invention.

As shown in FIG. 6, the mobile node MN#1 according to this embodiment includes a filtering controlling unit 16 and does not include the link layer address collecting unit 11 and the representative link address setting unit 14. Otherwise, the configuration of the mobile node MN#1 of this embodiment is the same as that of the mobile node MN#1 of the foregoing first embodiment.

The filtering controlling unit 16 is configured to instruct all network interface cards NIC#1 to NIC#n to start and stop an address filtering function on a link layer.

The operation of the packet communications system according to this embodiment is described with reference to FIGS. 7 to 8.

Figure 7:
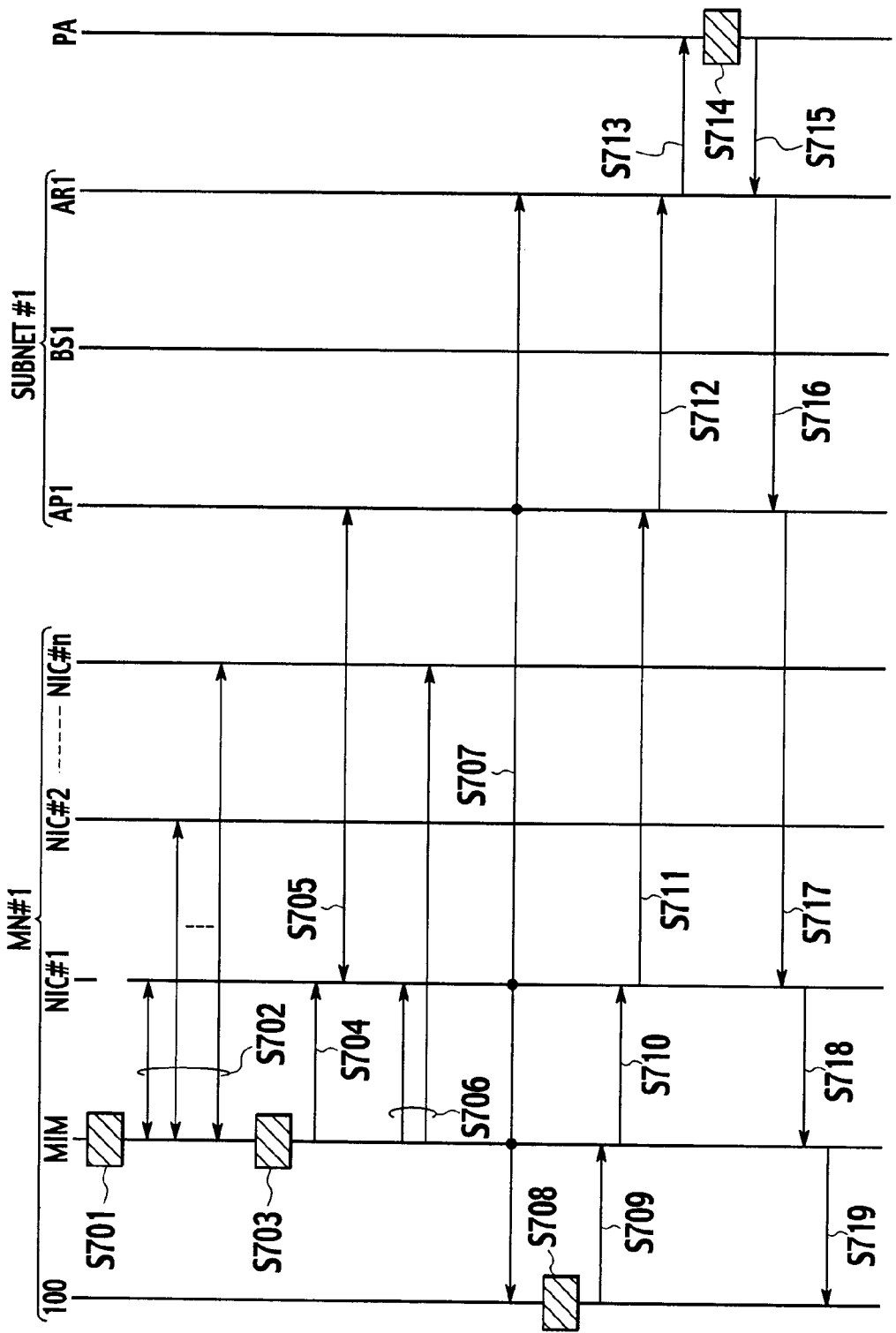
FIG. 7 is a sequence diagram showing an operation of the packet communications system according to the second embodiment of the present invention.

As shown in FIG. 7, in Step 701, a mobile node MN#1 is powered up, or a network interface card NIC is added to the mobile node MN#1.

In Step 702, the filtering controlling unit 16 instructs all the network interface cards NIC#1 to NIC#n to stop the address filtering function on the link layer.

In Step 703, a network interface card deciding unit 13 decides a representative MAC address among from collected MAC addresses, and also decides the network interface card NIC#1 to be used.

In Step 704, a controlling unit 15 instructs the network interface card NIC#1 to start its operation.

In Step 705, the network interface card NIC#1 establishes a communication link between the network interface card NIC#1 and a communication link system AP1, by the use of a MAC address #1 set for the network interface card NIC#1.

In Step 706, the controlling unit 15 instructs the network interface cards NIC#2 to NIC#n to suspend their operations.

In Step 707, an upper layer manager 100 carries out an address resolution process between the upper layer manager 100 and an access router AR1, through a communication manager MIM, the network interface card NIC#1, and the communication link system AP1, by the use of the aforementioned representative MAC address and a predetermined IP address.

In other words, in Step 707, the correspondence between the representative MAC address and the predetermined IP address is registered in the upper layer manager 100, the communication manager MIM, the network interface card NIC#1, the communication link system AP1, and the access router AR1.

In Step 708, the controlling unit 15 starts an operation in a paging control mode.

In Steps 709 to 713, the upper layer manager 100 transmits a paging registration packet containing the aforementioned representative MAC address and the predetermined IP address, to a routing control agent PA, through the communication manager MIM, the network interface card NIC#1, the communication link system AP1 and the access router AR1, by using the abovementioned representative MAC address and the IP address, without carrying out a new address resolution process.

In other words, in Steps 709 to 713, the upper layer manager 100, the communication manager MIM, the network interface card NIC#1, the communication link system AP1, and the access router AR1 transfer the paging registration packet, in accordance with the registered correspondence, respectively.

In Step 714, a paging area forming unit 32 forms a paging area (for example, subnets #1 and #2) associated with the abovementioned representative MAC address and the predetermined IP address, in accordance with the received paging registration packet.

In Steps 715 to 719, a paging registration packet receiving unit 31 transmits a paging registration response packet to the upper layer manager 100 of the mobile node MN#1, through the access router AR1, the communication link system AP1, the network interface card NIC#1 and the communication manager MIM, by using the aforementioned representative MAC address and the IP address, without carrying out a new address resolution process.

The paging registration response packet is a packet for notifying the upper layer manager 100 that the paging area has been formed.

In other words, in Steps 716 to 719, the access router AR1, the communication link system AP1, the network interface card NIC#1, the communication manager MIM, transfer the paging registration response packet, in accordance with registered the correspondence, respectively.

Figure 8:
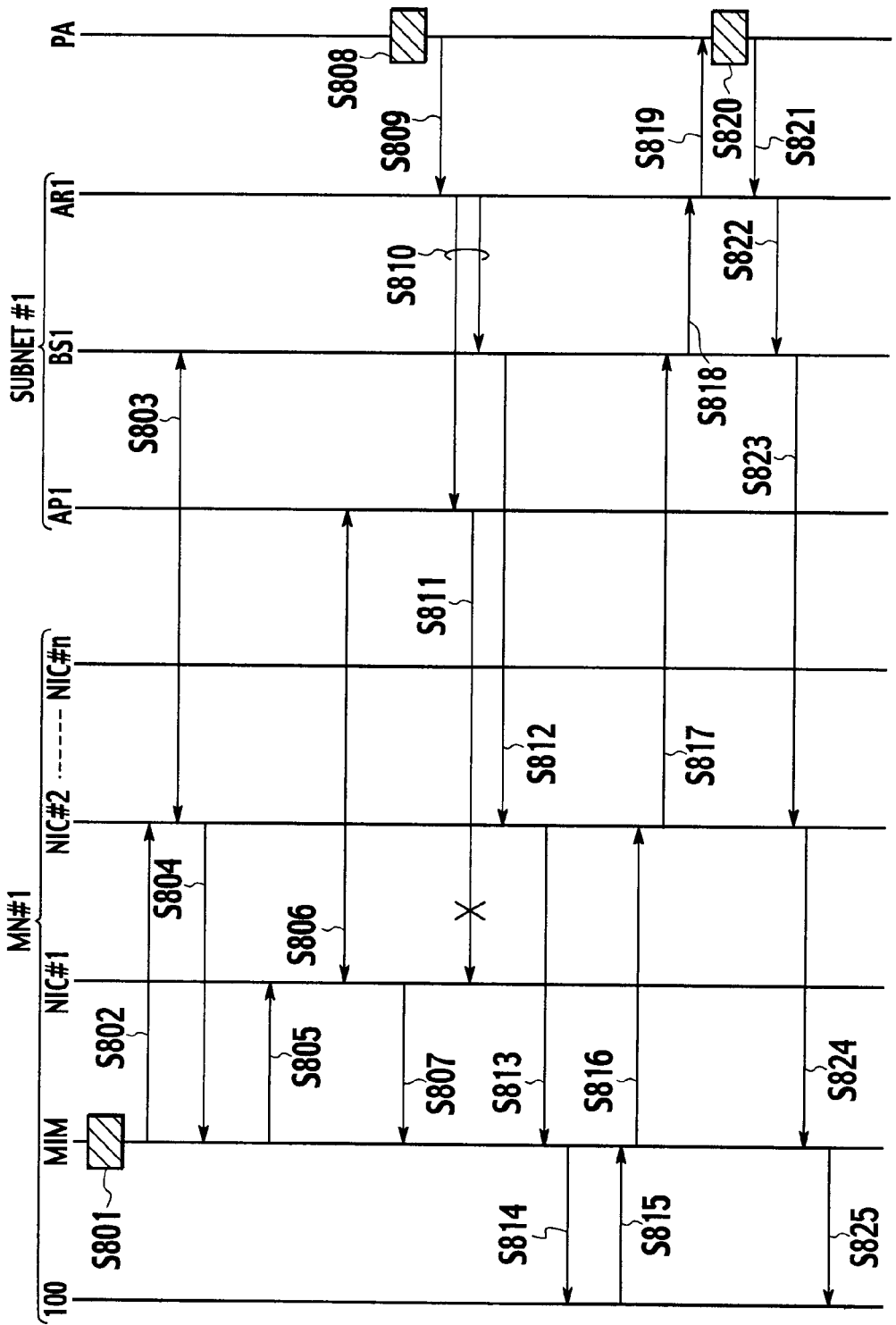
FIG. 8 is a sequence diagram showing the operation of the packet communications system according to the second embodiment of the present invention.

The operation of the packet communications system according to this embodiment, shown in FIG. 8, is the same as that of the packet communications system according to the first embodiment, shown in FIG. 5.

In the packet communications system according to this embodiment, the network interface card NIC transfers all the received packets to the upper layer manager 100 even when a MAC address (a representative MAC address) given to each of those packets is different from the MAC address set for each network interface card NIC. Therefore, a new address resolution process is not generated by the change of the network interface card NIC within the same subnet.

Packet Communications System According to the Third Embodiment of the Present Invention A packet communications system according to a third embodiment of the present invention is described with reference to FIGS. 9 to 12.

Description below is mainly about differences of the packet communications system according to this embodiment from the packet communications system according to the foregoing first embodiment.

Figures 9, 10:
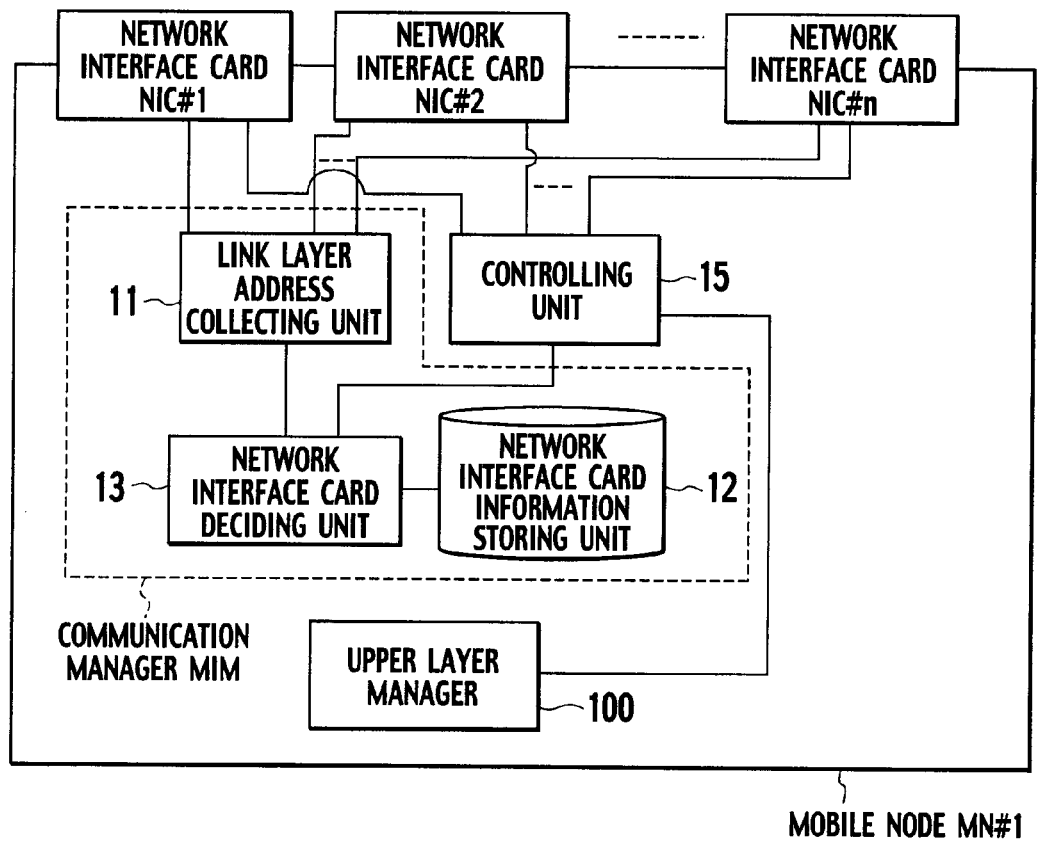
FIG. 9 is a functional block diagram of a mobile node according to the third embodiment of the present invention.
FIG. 10 is a view showing an example of managed content in a paging area managing unit of a routing control agent according to the third embodiment of the present invention.

As shown in FIG. 9, a mobile node MN#1 according to this embodiment does not include the representative link address setting unit 14. Otherwise, the configuration of the mobile node MN#1 according to this embodiment is the same as that of the mobile node MN#1 according to the foregoing first embodiment.

Moreover, the mobile node MN#1 according to this embodiment is configured to notify a routing control agent PA of a predetermined IP address and a plurality of MAC addresses #1 to #n which have been collected by a link layer address collecting unit 11 and respectively set for all network interface cards NIC#1 to NIC#n.

Specifically, an upper layer manager 100 is configured to notify the routing control agent PA of the abovementioned plurality of MAC addresses #1 to #n together with a paging registration packet.

Further, as shown in FIG. 10, a paging area managing unit 33 of the routing control agent PA according to this embodiment is configured to manage a paging area "subnets #1 and #2" (in other words, routing control information for implementing routing control) based on the IP address "IP_MN#1" assigned to the mobile node MN#1 and the plurality of representative MAC addresses #1 to #n.

The operation of the packet communications system according to this embodiment is described with reference to FIGS. 11 and 12.

Figure 11:
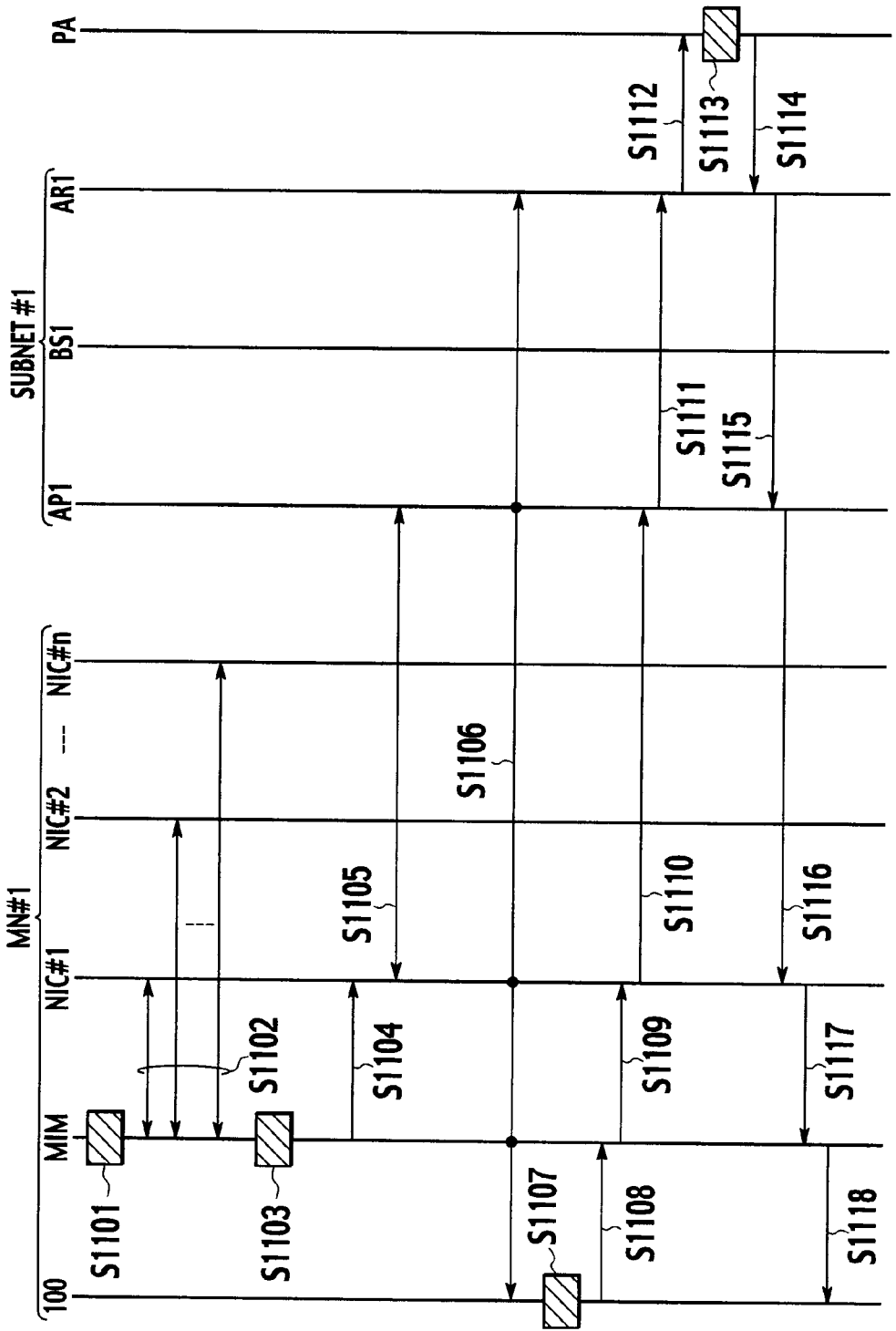
FIG. 11 is a sequence diagram showing an operation of the packet communications system according to the third embodiment of the present invention.

As shown in FIG. 11, in Step 1101, the mobile node MN#1 is powered up, or a network interface card NIC is added to the mobile node MN#1.

In Step 1102, the link layer address collecting unit 11 collects the MAC addresses set for network interface cards NIC#1 to NIC#n, respectively.

In Step 1103, a network interface card deciding unit 13 decides the network interface card NIC#1 to be used.

In Step 1104, a controlling unit 15 instructs the network interface card NIC#1 to start its operation.

In Step 1105, the network interface card NIC#1 establishes a communication link between the network interface card NIC#1 and a communication link system AP1, by using the MAC address #1 set for the network interface card NIC#1.

In step 1106, an upper layer manager 100 carries out an address resolution process between the upper layer manager 100 and an access router AR1, through a communication manager MIM, the network interface card NIC#1 and the communication link system AP1, by the use of the foregoing MAC address #1 and a predetermined IP address.

In other words, in Step 1106, the correspondence between the MAC address #1 and the predetermined IP address is registered in the upper layer manager 100, the communication manager MIM, the network interface card NIC#1, the communication link system AP1, and the access router AR1.

In Step 1107, the controlling unit 15 starts an operation in a paging control mode.

In Steps 1108 to 1112, the upper layer manager 100 transmits a paging registration packet containing the foregoing plurality of MAC addresses #1 to #n and the predetermined IP address, to the routing control agent PA, through the communication manager MIM, the network interface card NIC#1, the communication link system AP1, and the access router AR1, by using the foregoing MAC address #1 and the IP address, without carrying out a new address resolution process.

In other words, in Steps 1108 to 1112, the upper layer manager 100, the communication manager MIM, the network interface card NIC#1, the communication link system AP1, and the access router AR1 transfer the paging registration packet, in accordance with the registered correspondence, respectively.

In Step 1113, a paging area forming unit 32 forms a paging area (for example, subnets #1 and #2) associated with the abovementioned MAC addresses #1 to #n and the predetermined IP address, in accordance with the received paging registration packet.

In Steps 1114 to 1118, a paging registration packet receiving unit 31 transmits a paging registration response packet to the upper layer manager 100 of the mobile node MN#1, through the access router AR1, the communication link system AP1, the network interface card NIC#1, and the communication manager MIM, by using the foregoing MAC address #1 and the IP address, without carrying out a new address resolution process.

The paging registration response packet is a packet for notifying the upper layer manager 100 that the paging area has been formed.

In other words, in Steps 1115 to 1118, the access router AR1, the communication link system AP1, the network interface card NIC#1, the communication manager MIM, transfer the paging registration response packet, in accordance with registered the correspondence, respectively.

Figure 12:
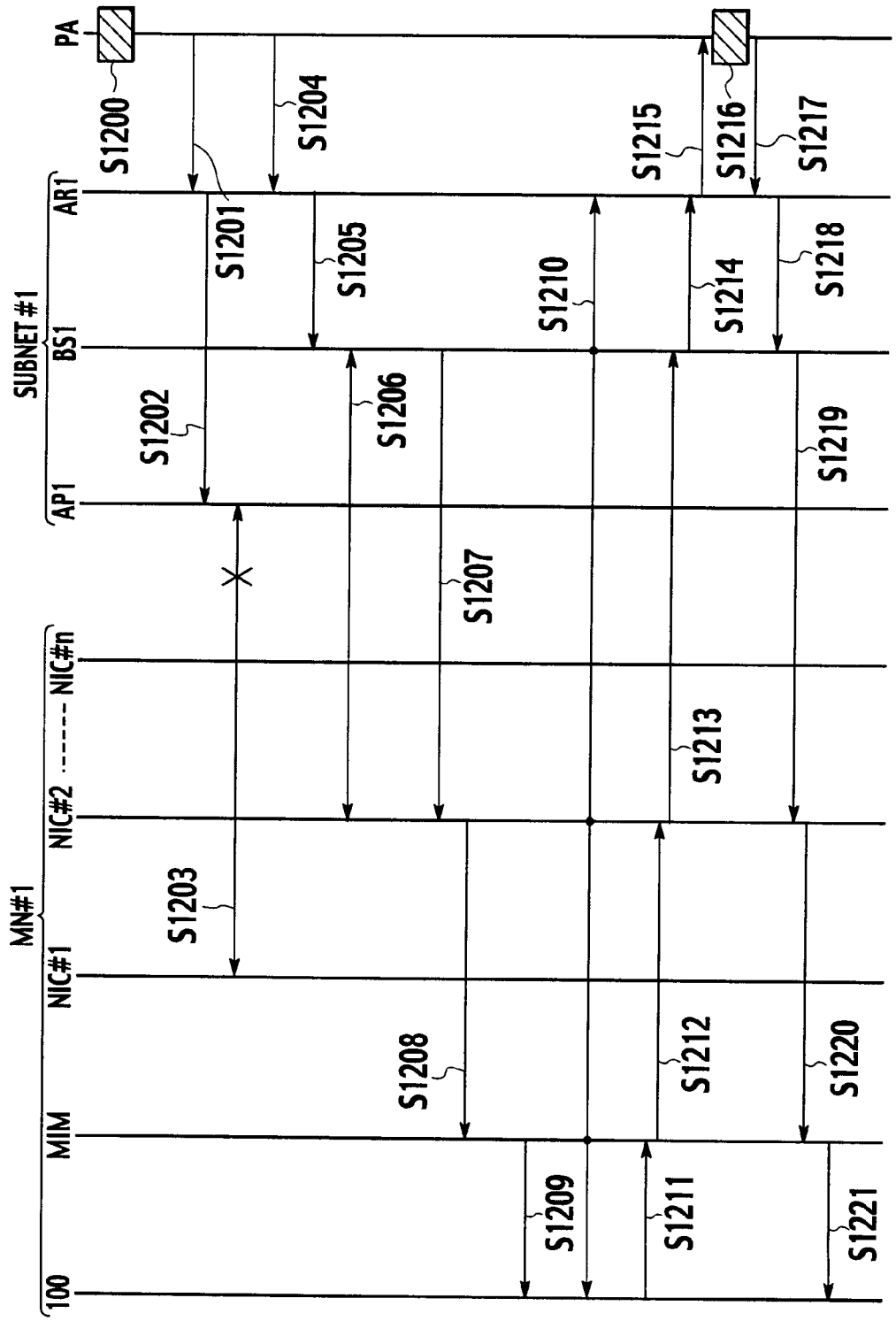
FIG. 12 is a sequence diagram showing the operation of the packet communications system according to the third embodiment of the present invention.

As shown in FIG. 12, in Step 1200, a packet detecting unit 34 of the routing control agent PA receives a packet destined for the mobile node MN#1.

In Steps 1201 and 1204, a paging notification packet transmitting unit 35 transmits a paging notification packet containing the MAC address #1 and a paging notification packet containing the MAC address #2, to the access router AR1.

In Steps 1202 and 1205, the access router AR1 transmits the abovementioned paging notification packets respectively to the communication link systems AP1 and BS1 which manage the paging area of the mobile node MN#1, that is, the subnets #1 and #2.

In Step 1203, the communication link system AP1 attempts to establish a communication link between the communication link system AP1 and the network interface card NIC#1 by using the MAC address #1, but fails.

Meanwhile, in Step 1206, the communication link system BS1 establishes a communication link between the communication link system BS1 and the network interface card NIC#2 by using the MAC address #2.

In Step 1207, the communication link system BS1 transmits the foregoing paging notification packets to the network interface card NIC#2, by using the MAC address #2 and the IP address without carrying out a new address resolution process.

In other hand, the communication link system BS1 transmits the paging notification packets to the network interface card NIC#2, in accordance with the registered correspondence.

In Steps 1208 and 1209, the paging notification packets received by the network interface card NIC#2 are transmitted to the upper layer manager 100.

In Step 1210, an address resolution process is carried out between the upper layer manager 100 and the access router AR1, through the communication manager MIM, the network interface card NIC#2, and the communication link system BS1, by using the foregoing MAC address #2 and the predetermined IP address.

In other words, in Step 1210, the correspondence between the MAC address #2 and the predetermined IP address is registered in the upper layer manager 100, the communication manager MIM, the network interface card NIC#2, the communication link system BS1, and the access router AR1.

In Steps 1211 to 1215, the upper layer manager 100 transmits a paging notification acknowledgement packet corresponding to the aforementioned paging notification packets, to the routing control agent PA, through the communication manager MIM, the network interface card NIC#2, the communication link system BS1, and the access router AR1, by using the foregoing MAC address #2 and the IP address, without carrying out a new address resolution process.

In other words, in Steps 1211 to 1215, the upper layer manager 100, the communication manager MIM, the network interface card NIC#2, the communication link system BS1, and the access router AR1 transfer the paging notification acknowledgement packet, in accordance with the registered correspondence, respectively.

In Step 1216, a packet transferring unit 37 extracts the packet destined for the mobile node MN#1, which has been buffered in the packet detecting unit 34, in accordance with the received paging notification acknowledgement packet.

In Steps 1217 to 1221, the packet transferring unit 37 transmits the packet destined for the mobile node MN#1 to the upper layer manager 100, through the access router AR1, the communication link system BS1, the network interface card NIC#2, and the communication manager MIM, by using the foregoing MAC address #2 and the IP address, without carrying out a new address resolution process.

In other words, in Steps 1218 to 1221, the access router AR1, the communication link system BS1, the network interface card NIC#2, the communication manager MIM transfer the packet destined for the mobile node MN#1, in accordance with the registered correspondence, respectively.

Packet Communications System According to the Fourth Embodiment of the Present Invention A packet communications system according to a fourth embodiment of the present invention is described with reference to FIGS. 13 to 16.

Description below is mainly about differences of the packet communications system of this embodiment from the packet communications system of the foregoing first embodiment.

Figure 13:
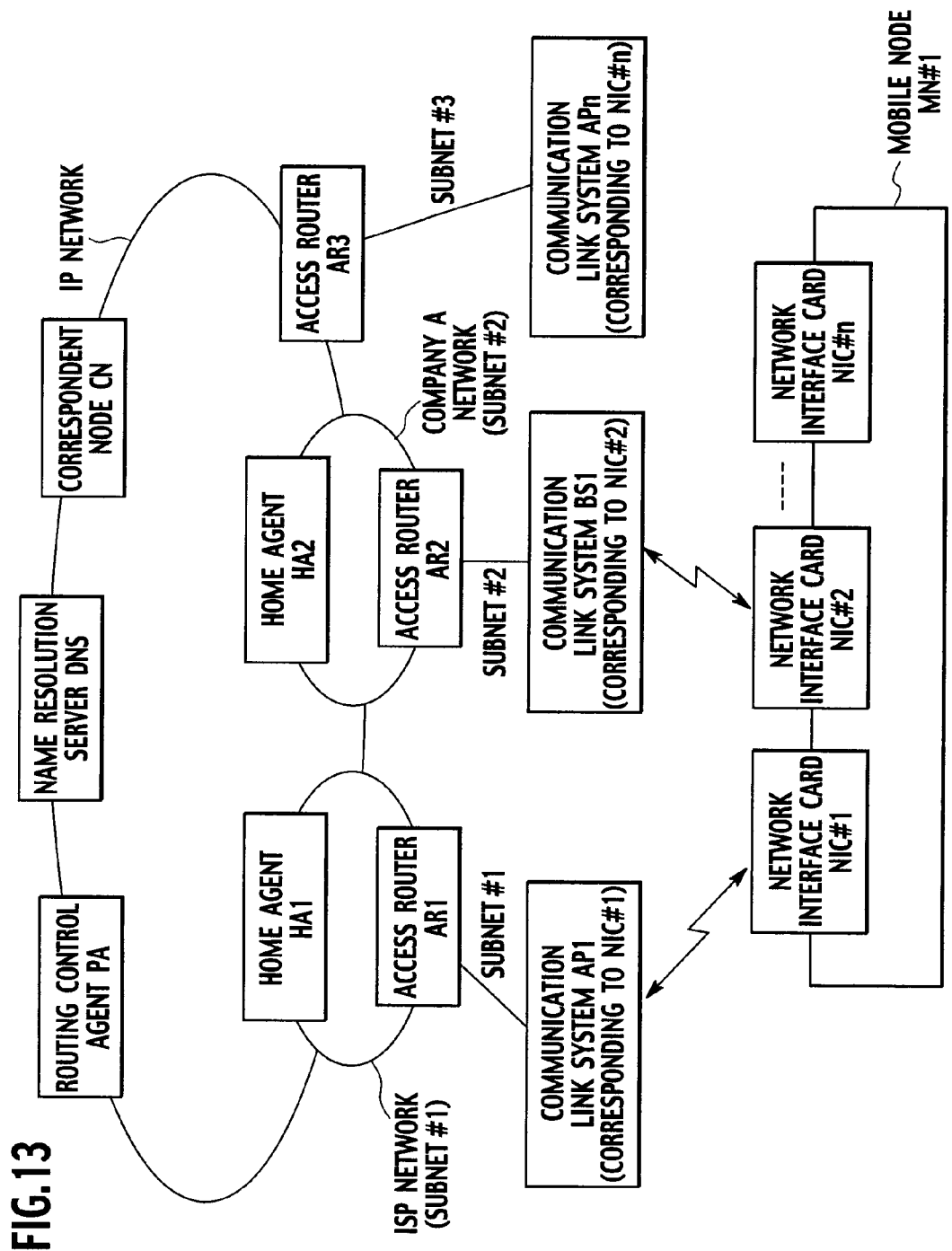
FIG. 13 is a block diagram of the entire packet communications system according to fourth and fifth embodiments of the present invention.

As shown in FIG. 13, the packet communications system according to this embodiment includes a routing control agent PA, home agents HA1 and HA2, access routers AR1 to AR3, communication link systems AP1, BS1, APn, and a mobile node MN#1.

In the packet communications system according to this embodiment, the plurality of home agents HA1 and HA2 implement routing control of a received packet destined for the mobile node MN#1, in accordance with each home address and each care-of address. In this embodiment, the mobile node MN#1 is in a multi-home situation.

Figure 14:
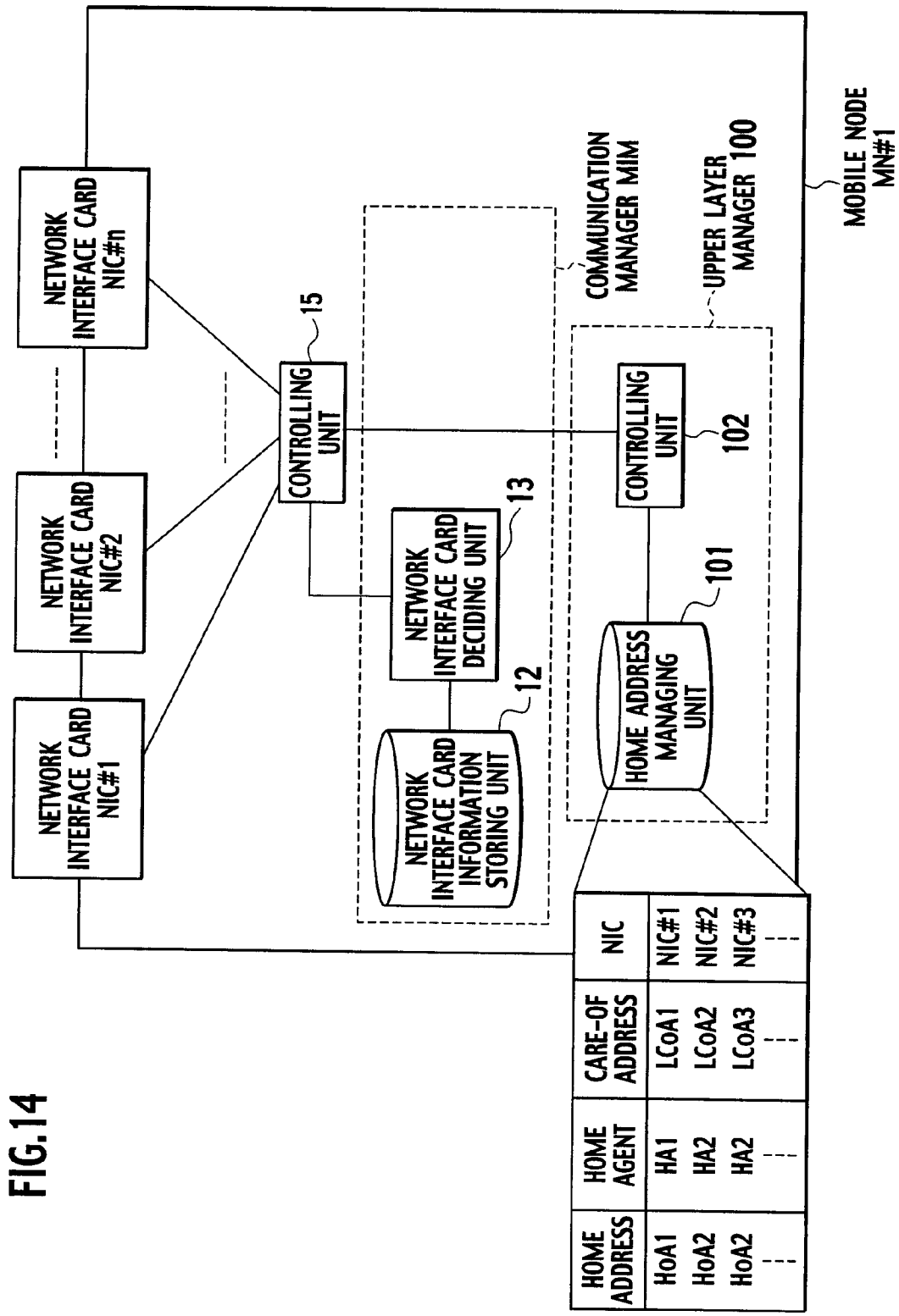
FIG. 14 is a functional block diagram of a mobile node according to the fourth and fifth embodiments of the present invention.

Further, as shown in FIG. 14, the mobile node MN#1 according to this embodiment does not include the link layer address collecting unit 11 and the representative link layer address setting unit 14, and includes a home address managing unit 101 and a controlling unit 102 within the upper layer manager 100. Otherwise, the configuration of the mobile node MN#1 according to this embodiment is the same as that of the mobile node MN#1 according to the foregoing first embodiment.

The home address managing unit 101 is configured to manage a "home address", a "home agent", a "care-of address", and a "network interface card NIC" while associating them with each other.

The controlling unit 102 collaborates with a controlling unit 15 to instruct the home agents HA1 and HA2 to transfer a packet destined for the mobile node MN#1 to a representative home address associated with a representative network interface card which is decided so as to receive the packet destined for the mobile node MN#1.

Figure 15:
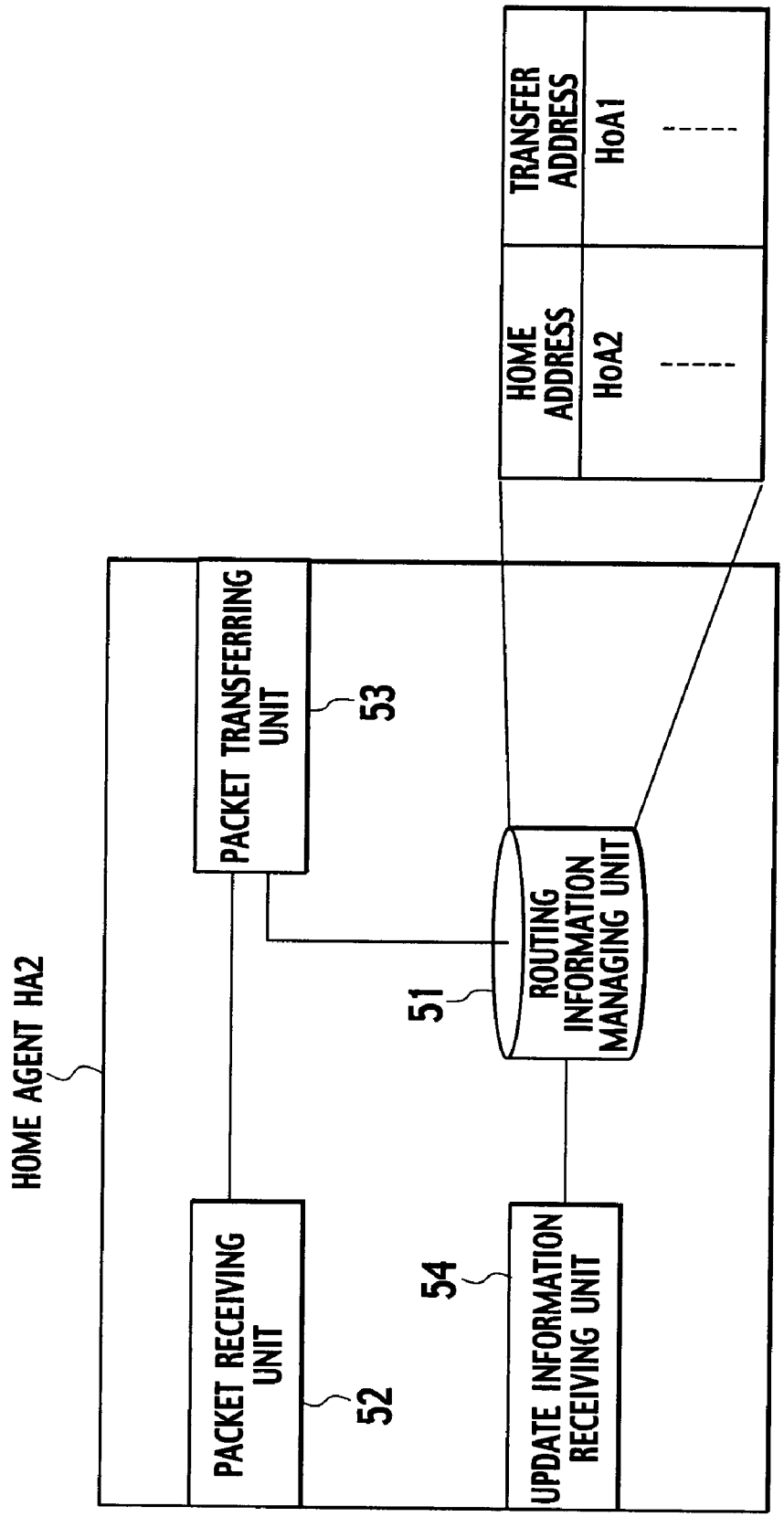
FIG. 15 is a functional block diagram of a home agent according to the fourth and fifth embodiments of the present invention.

As shown in FIG. 15, the home agent HA2 includes a routing information managing unit 51, a packet receiving unit 52, a packet transferring unit 53, and an update information receiving unit 54.

The routing information managing unit 51 is configured to manage routing information destined for the aforementioned representative home address by associating the "home address" and a "transfer address" with each other.

The packet receiving unit 52 is configured to receive various packets through a company A network.

The packet transferring unit 53 is configured to refer to the routing information managing unit 51, and to transfer the packet destined for the mobile node MN#1 to the representative home address.

The update information receiving unit 54 is configured to receive binding update information from the mobile node MN#1, and to update the routing information destined for the representative home address, which is contained in the routing information managing unit 51.

Figure 16:
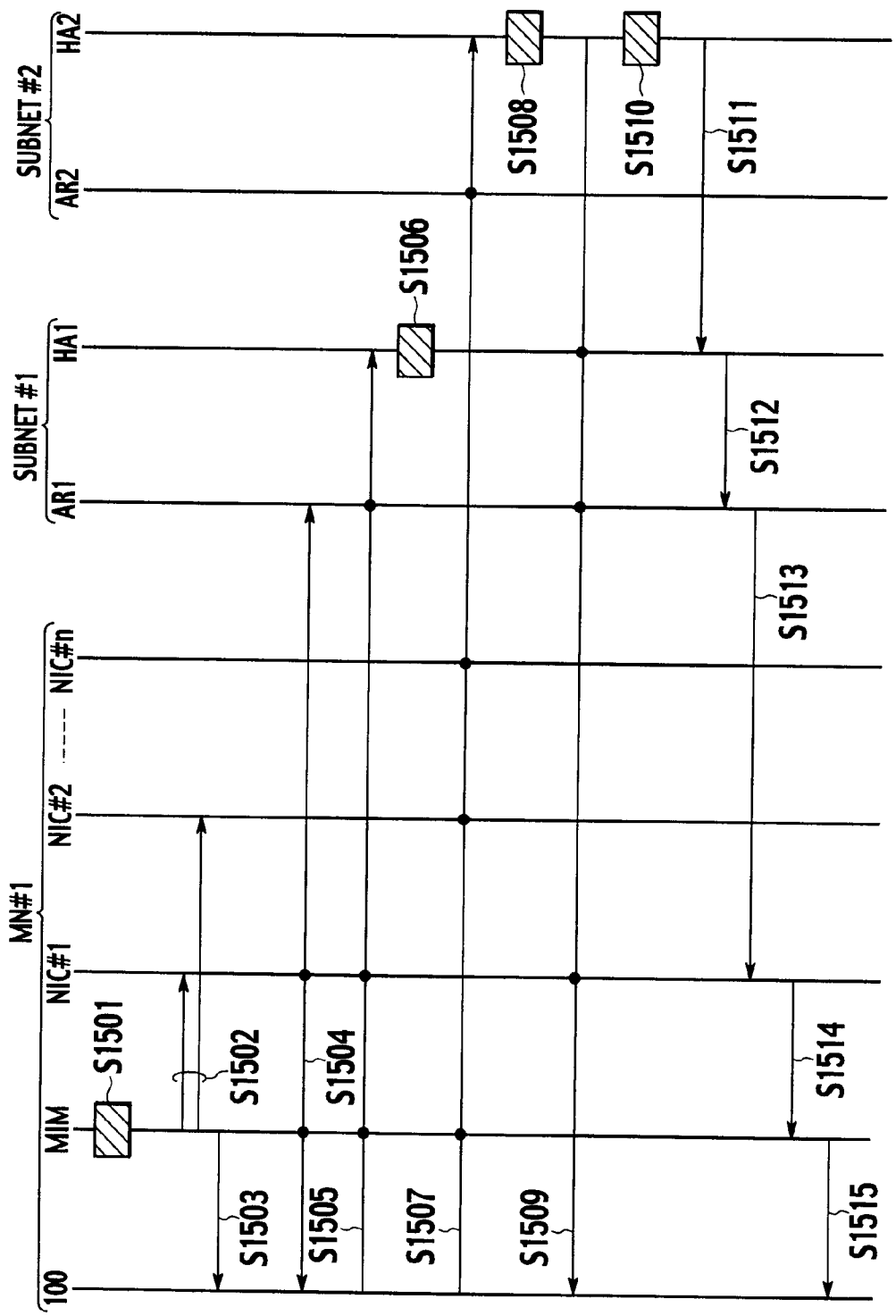
FIG. 16 is a sequence diagram showing an operation of the packet communications system according to the fourth embodiment of the present invention.

The operation of the packet communications system according to this embodiment is described with reference to FIG. 16.

In this embodiment, the mobile node MN#1 enables only a network interface card NIC#1 which corresponds to a communication link system with the lowest communication costs, a network interface card NIC#1 used by a user for business use, or a network interface card NIC#1 which makes the highest contribution to power savings.

The mobile node MN#1 disables the rest of the network interface cards NIC and brings link down or stops their operations.

In such a case, when the home agent HA2, which manages a home address HoA2 of the mobile node MN#1, exists in an internet service provider (ISP) providing an internet connection service by using the communication link system BS1 corresponding to the disabled network interface card NIC#2 or an IP network connected with the communication link system BS1, no packet can reach the mobile node MN#1 through a transfer route with the home agent HA2 as a base point, even where the mobile node MN#1 has the network interface card NIC#1 which can establish an enabled transfer route.

In order to resolve such a problem, the packet communications system according to this embodiment operates as follows.

In Step 1501, a network interface card deciding unit 13 decides the network interface card NIC#1 to be used as a representative network interface card.

In Steps 1502 and 1503, the controlling unit 15 transmits notification of change from the network interface card NIC#2 to the network interface card NIC#1, to the network interface cards NIC#1 and NIC#2.

In Step 1504, the network interface card NIC#1 acquires a care-of address LCoA1 which belongs to a subnet #1 in the communication link system AP1, from an access router AR1.

In Steps 1505 and 1506, the network interface card NIC#1 sends binding update of the home address HoA1 and the care-of address LCoA1 (HoA1 to LCoA1) to the home agent HA1, thereby securing a transfer route between the network interface card NIC#1 and the home agent HA1.

To be more specific, in Step 1504, a correspondence between each MAC address and the acquired care-of address LCoA1 is registered in the upper layer manager 100, the communication manager MIM, the network interface NIC#1, and the access router AR1.

Further, in Steps 1505 and 1506, the routing information indicating to transfer a packet destined for the home address HoA1 to the care-of address LoA1 is registered in the communication manager MIM, the network interface NIC#1, the access router AR1, and the home agent HA1.

In Steps 1507 to 1509, the network interface card NIC#1 sends binding update of the home address HoA2 and the home address (the representative home address) HoA1 (HoA2 to HoA1) to the home agent HA2 which corresponds to a transfer route through which packets cannot go due to the aforementioned change of the network interface card.

To be more specific, in Steps 1507 to 1509, the routing information indicating to transfer a packet destined for the home address HoA2 to the home address HoA1 is registered in the communication manager MIM, the network interface NIC#1, NIC#2, the access router AR1, AR2, and the home agent HA1, HA2.

In Step 1510, the home agent HA2 receives a packet destined for the mobile node MN#1. The packet designates the home address HoA2 as the destination address thereof.

In Step 1511, the home agent HA2 refers to the routing information managing unit 51, and transfers the packet destined for the mobile node MN#1 to the home agent HA1.

In Steps 1512 to 1515, the packet destined for the mobile node MN#1, which has been received by the home agent HA1, reaches an upper layer manager 100 through the transfer route between the network interface card NIC#1 and the home agent HA1.

In this embodiment, when there are no packets to be transmitted and received, the mobile node MN#1 may be configured to stop sending the binding update accompanied by the change of the access router AR where the mobile node MN#1 is located, so that packets destined for the mobile node MN#1 are transferred to a routing control agent PA.

In such a case, all the home agents HA are set to transfer packets destined for the mobile node MN#1 to the routing control agent PA, the packets designating the home addresses HoA managed by the home agents HA themselves as the destination addresses of the packets.

As a result, all the packets destined for the mobile node MN#1 are transferred to the routing control agent PA through any home agents HA. Therefore, paging is definitely performed.

Packet Communications System According to the Fifth Embodiment of the Present Invention A packet communications system according to a fifth embodiment of the present invention is described with reference to FIG. 17.

Description below is mainly about differences of the packet communications system according to this embodiment from the packet communications system according to the foregoing fourth embodiment.

The configurations of a mobile node MN#1 and home agents HA of this embodiment are the same as those of the mobile node MN#1 and the home agents HA of the foregoing fourth embodiment.

The operation of the packet communications system according to this embodiment is described with reference to FIG. 17.

In Step 1601, a network interface card deciding unit 13 decides a network interface card NIC#1 as a representative network interface card, in accordance with a communication status of the mobile node MN#1, and the like.

In Steps 1602 and 1603, a controlling unit 15 transmits notification of the change from a network interface card NIC#n to the network interface card NIC#1, to the network interface cards NIC#n and NIC#2.

In Step 1604, the network interface card NIC#1 acquires a care-of address LCoA1 which belongs to a subnet #1 in a communication link system AP1, from an access router AR1.

In Steps 1605 and 1606, the network interface card NIC#1 sends binding update of a home address HoA1 and the care-of address LCoA1 (HoA1 to LCoA1), to a home agent HA1, thereby securing a transfer route between the network interface card NIC#1 and the home agent HA1.

To be more specific, in Step 1604, a correspondence between each MAC address and the acquired care-of address LCoA1 is registered in the upper layer manager 100, the communication manager MIM, the network interface NIC#1, and the access router AR1.

Further, in Steps 1605 and 1606, the routing information indicating to transfer a packet destined for the home address HoA1 to the care-of address LoA1 is registered in the communication manager MIM, the network interface NIC#1, the access router AR1, and the home agent HA1.

In Step 1607, an upper layer manager 100 performs DNS registration so that a DNS server is instructed to transfer packets destined for the mobile node MN#1 to the home address (the representative home address) HoA1.

The upper layer manager 100 of the mobile node MN#1 performs the abovementioned DNS registration, every time the change of the home agent, which is caused by the change of the network interface card, is detected.

According to the packet communications system of this embodiment, a correspondent node CN can detect an enabled transfer route among from a plurality of transfer routes to the mobile node MN#1, through DNS.

As described so far, according to the present invention, it is possible to provide a mobile terminal, a control apparatus, and a home agent which are used in a packet communications system which can ensure packet reachability without wasting wireless resources, even when a network interface card NIC to be used changes.

Obviously, numerous modifications and variations of the present invention are possible in light of the above teachings. It is therefore to be understood that within the scope of the appended claims, the invention may be practiced otherwise than as specifically described herein.

What is claimed is:

1. A mobile terminal in a packet communications system in which a control apparatus implements routing control of a received packet directed for the mobile terminal, the mobile terminal comprising:
   a plurality of network interface cards;
   a communication manager configured to select at least one network interface card from the plurality of network interface cards, in accordance with information regarding the network interface card; and
   an upper layer manager configured to receive the packet transmitted from the control apparatus, with using a selected network interface card, and
   wherein a plurality of home agents, which each correspond to a different network, are configured to implement routing control of a received packet destined for the mobile terminal, in accordance with each home address and each care-of address, in the packet communications system;

each of the plurality of network interface cards is configured to be connectable to the plurality of home agents; and the upper layer manager comprises:

a manager configured to associate each of the network interface cards with a different one of each of the home addresses respectively corresponding to each one of the plurality of home agents; and an instructor configured to instruct the plurality of home agents to transfer the packet destined for the mobile terminal to a home address associated with the selected network interface card.

2. The mobile terminal according to claim 1, wherein the instructor is configured to give the instruction to the plurality of home agents, by binding update for the representative home address.

3. The mobile terminal according to claim 1, wherein the packet communications system is configured to transfer the packet destined for the mobile terminal to the home agents through a domain name system (DNS) server, and the instructor is configured to instruct the DNS server to transfer the packet destined for the mobile terminal to the representative home address.

4. The mobile terminal according to claim 1, wherein the instructor is configured instruct the selected network interface card to acquire a care-of-address from an access point corresponding to the home address associated with the selected network interface card, and instruct the selected network interface card to send a binding update of the home address and the care-of-address to the home agent corresponding to the home address associated with the selected network interface card.

5. The mobile terminal according to claim 1, wherein the instructor is configured to instruct the selected network interface card to send a binding update of the home address of the selected network interface card and a home address of a network interface card that was not selected to a home agent that does not correspond to the home address of the selected network interface card.

6. A home agent in a packet communications system in which a plurality of home agents implement routing control of a received packet destined for a mobile terminal, in accordance with each home address and each care-of address, the home agent comprising:

a receiver configured to receive a representative home address from the mobile terminal including a plurality of network interface cards, the representative home address being decided among the home addresses associated with the network interface cards, wherein each of the plurality of home addresses correspond to one of the plurality of home agents that each correspond to a different network;

a packet transferor configured to transfer the packet destined for the mobile terminal to the representative home address;

a routing information manager configured to manage routing information destined for the representative home address, wherein the packet transferor is configured to transfer the packet destined for the mobile terminal, in accordance with the routing information destined for the representative home address, the routing information manager is configured to update the routing information destined for the representative home address in accordance with binding update from the mobile terminal, the packet communications system comprises a control apparatus which transmits a paging notification packet to a paging area of the mobile terminal when receiving the packet destined for the mobile terminal, so as to acquire location information of the mobile terminal and to decide a transfer destination of the packet, and the routing information destined for the representative home address is set so that the packet destined for the mobile terminal is transferred to the control apparatus.

7. A packet communication method in which a control apparatus implements routing control of a received packet directed for a mobile terminal, the method comprising:

selecting at least one network interface card from a plurality of network interface cards included in the mobile terminal, in accordance with information regarding the network interface card;

receiving the packet transmitted from the control apparatus, with using a selected network interface card;

implementing, at each of a plurality of home agents, which each correspond to a different network, routing control of a received packet destined for the mobile terminal, in accordance with each home address and each care-of address, the plurality of home agents connected by each of the plurality of network interface cards;

associating each of the network interface cards with a different one of each of the home addresses respectively corresponding to each one of the plurality of home agents; and instructing the plurality of home agents to transfer the packet destined for the mobile terminal to a home address associated with the selected network interface card.

\* \* \* \* \*